United States Patent [19]

Morris

[11] 4,221,524
[45] Sep. 9, 1980

[54] APPARATUS FOR RETRIEVING BALLS

[76] Inventor: Kenneth A. Morris, 12584 Caminito de la Gallarda, Rancho Bernardo, Calif. 92128

[21] Appl. No.: 871,646

[22] Filed: Jan. 23, 1978

Related U.S. Application Data

[63] Continuation-in-part of Ser. No. 767,636, Feb. 10, 1977, abandoned.

[51] Int. Cl.² ............................................. B60P 1/36
[52] U.S. Cl. .................................. 414/439; 198/509; 198/715
[58] Field of Search ........ 214/350, 152, 353, 355–357; 56/328 R; 198/307, 310, 311, 506, 509, 518, 522, 715; 298/12; 414/434, 437, 439–441

[56] References Cited

U.S. PATENT DOCUMENTS

| | | | |
|---|---|---|---|
| 864,768 | 9/1907 | Bloomingdale | 298/12 |
| 2,561,754 | 7/1951 | Propheter | 56/328 R |
| 2,687,201 | 8/1954 | Bergman | 198/310 X |
| 2,919,791 | 6/1960 | Hampf | 198/715 |
| 2,940,242 | 6/1960 | Patterson | 56/328 R |
| 3,102,647 | 9/1963 | Bonney | 214/356 |
| 3,595,000 | 7/1971 | Recker | 214/356 X |
| 3,986,324 | 10/1976 | Harriot et al. | 56/328 R X |
| 3,995,759 | 12/1976 | Hollrock et al. | 214/356 |

Primary Examiner—Robert G. Sheridan
Attorney, Agent, or Firm—Le Blanc, Nolan, Shur & Nies

[57] ABSTRACT

A handcart for retrieving tennis balls lying on a ground or floor surface and comprising a wheeled support structure adapted to be wheeled along said surface, a ball collection receptacle supported on said structure at approximately waist level about said surface, and means supported on said structure for picking up balls lying on said surface and depositing the picked-up balls in said receptacle.

3 Claims, 38 Drawing Figures

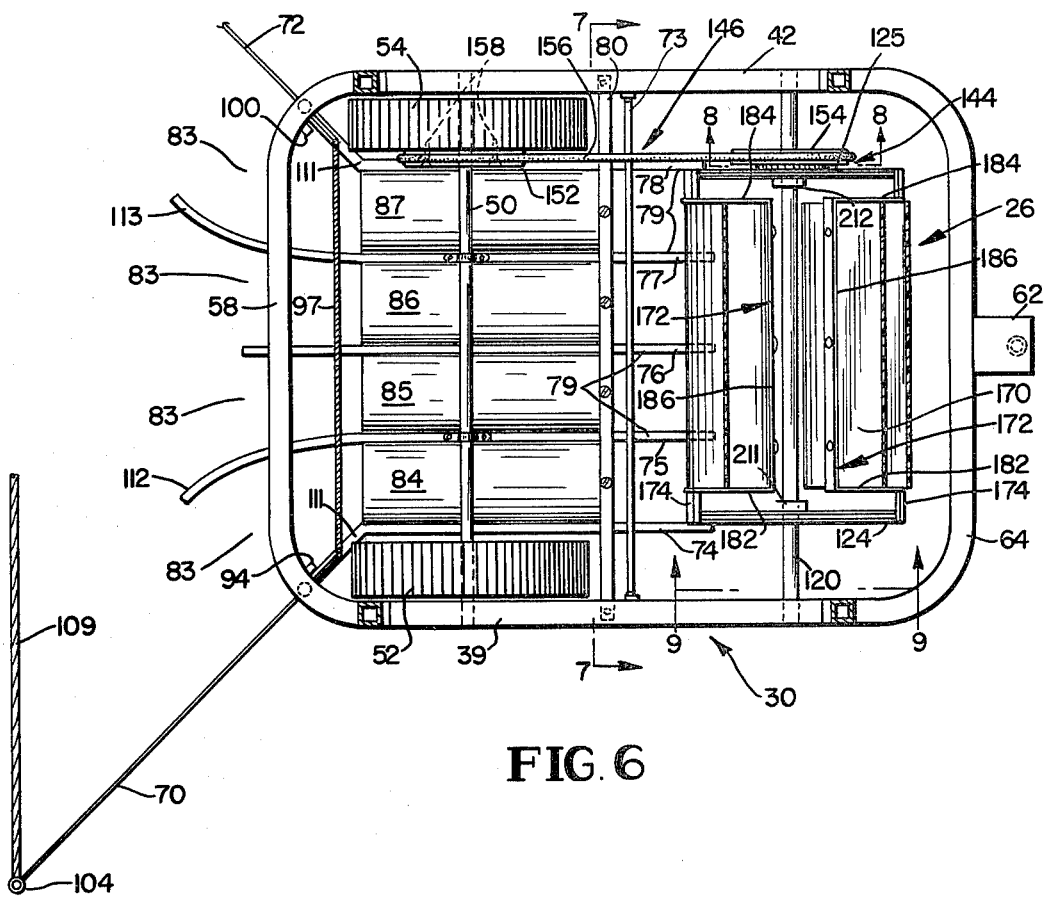
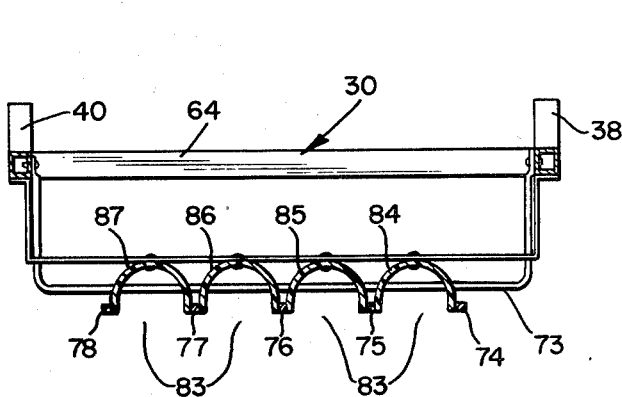
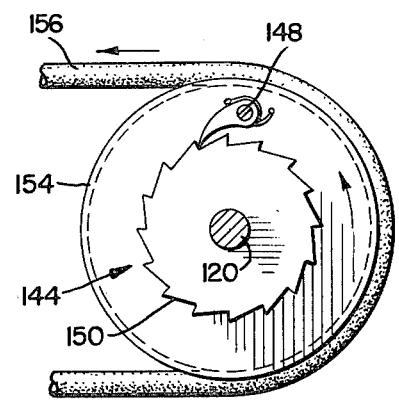
FIG. 6
FIG. 7
FIG. 8

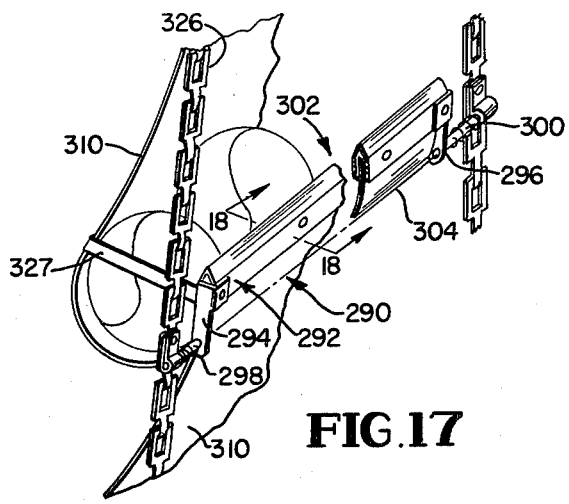
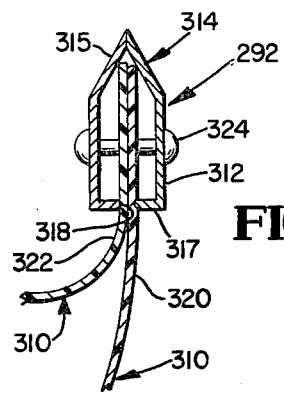
FIG. 17    FIG. 18
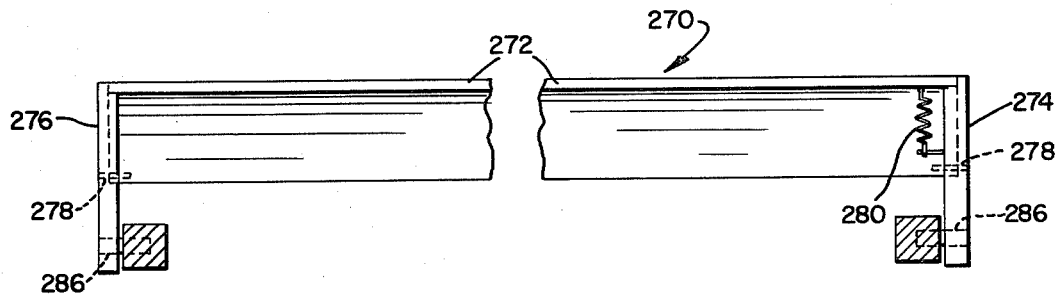
FIG. 14
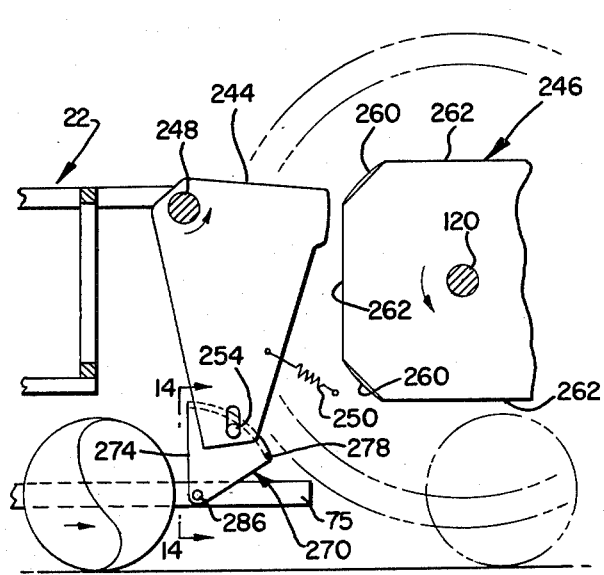
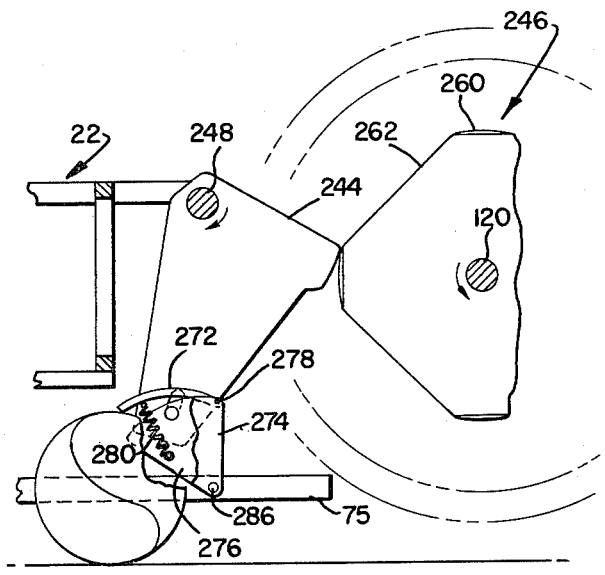
FIG. 13    FIG. 15

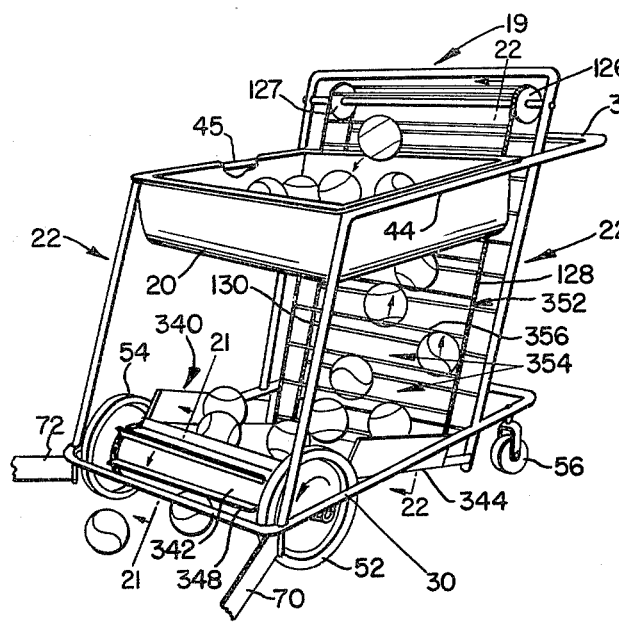
FIG. 20
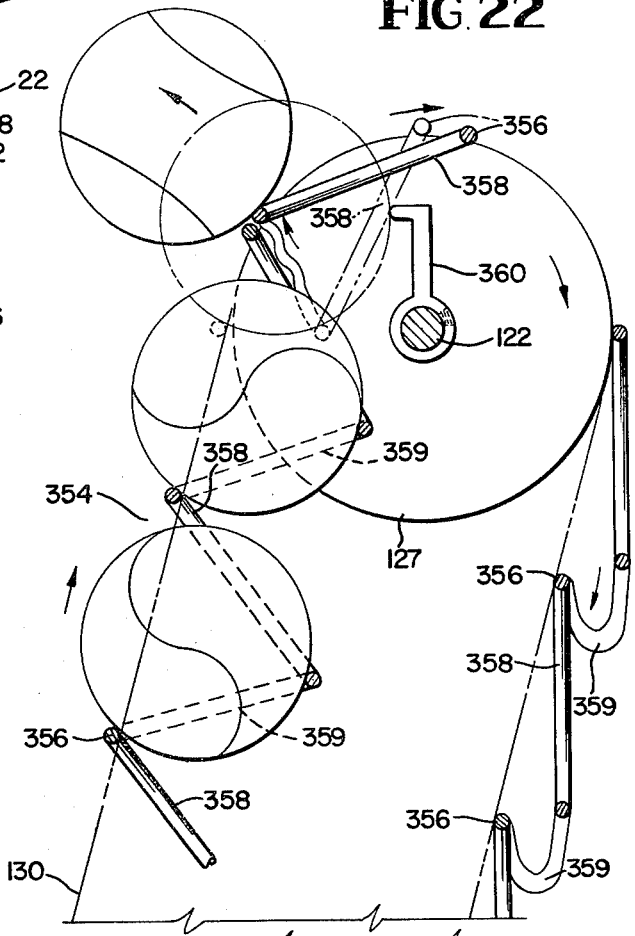
FIG. 22
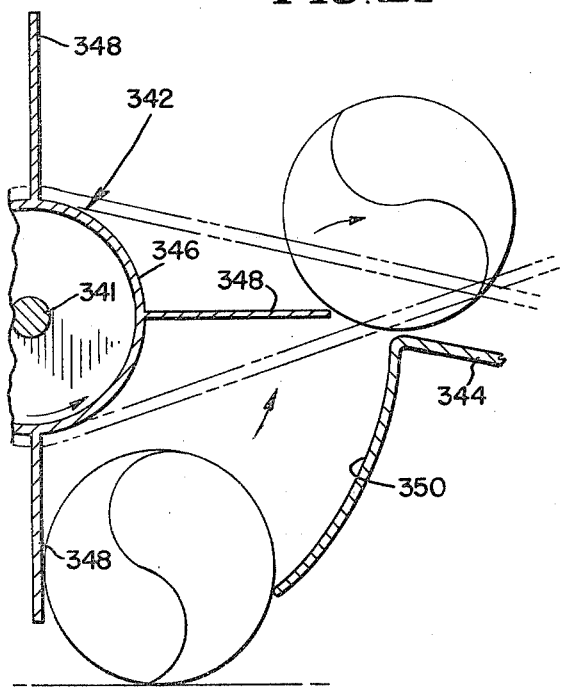
FIG. 21
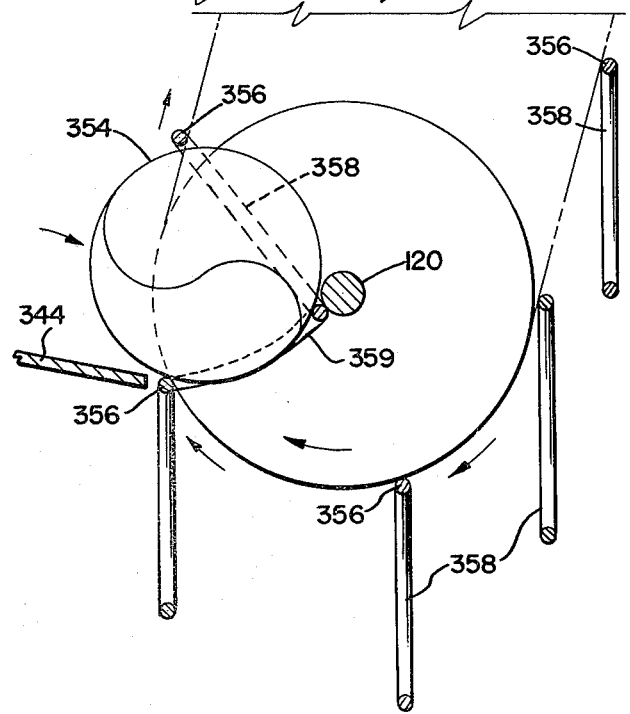

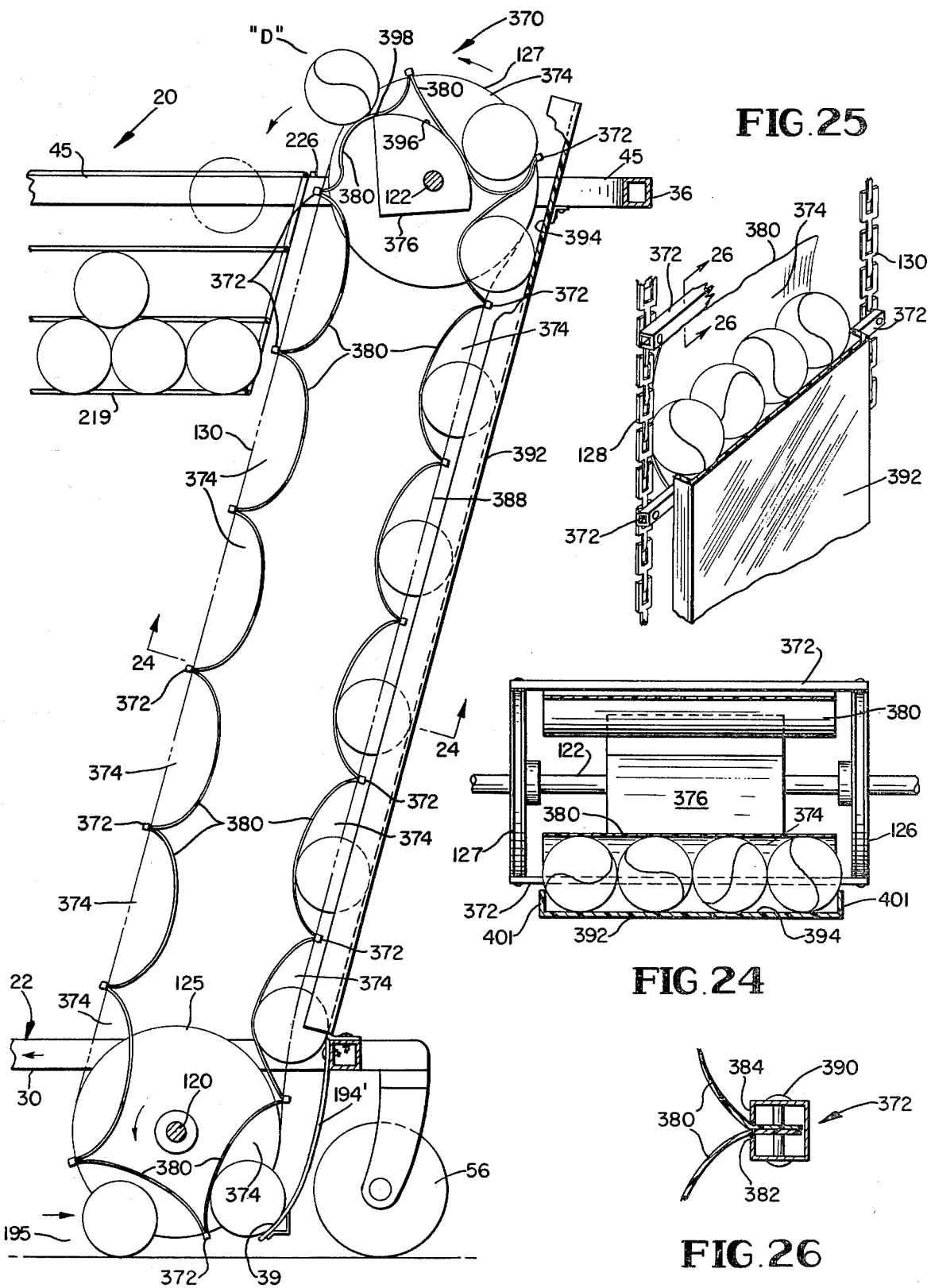

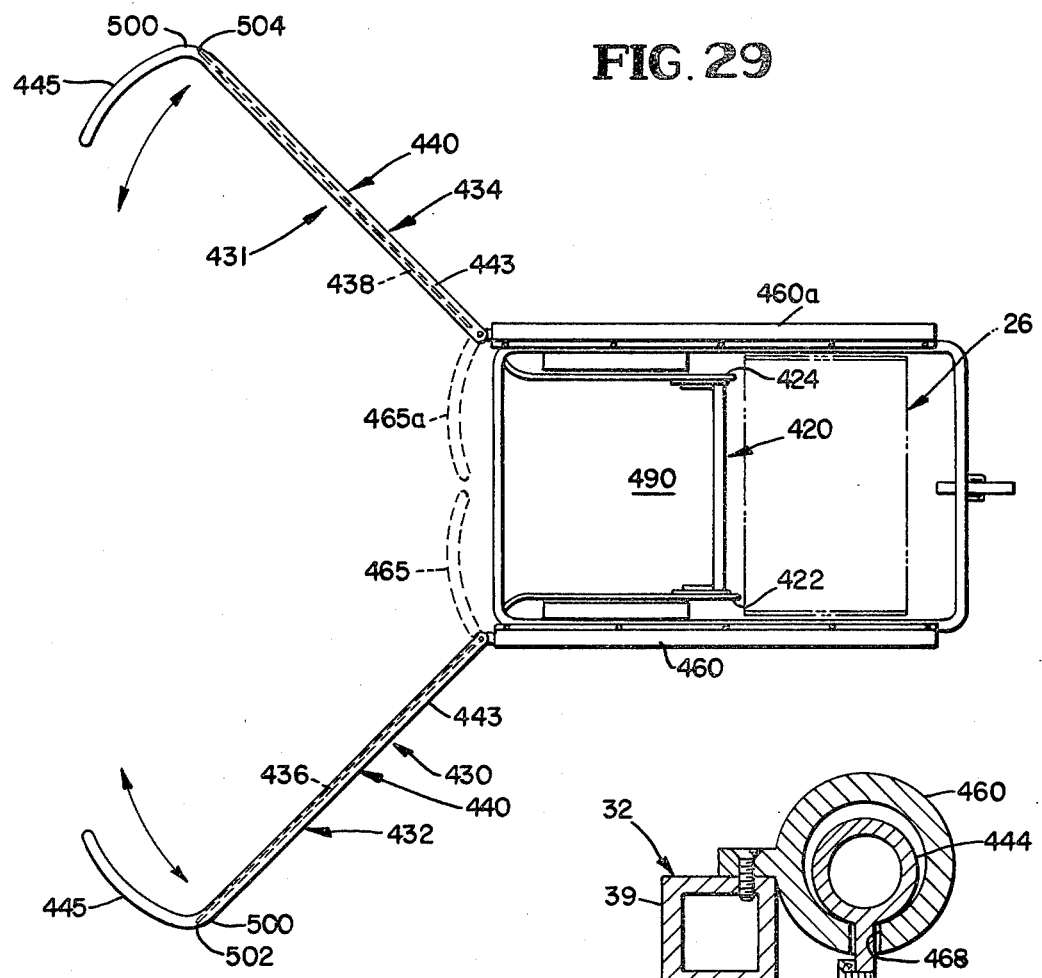
FIG. 29
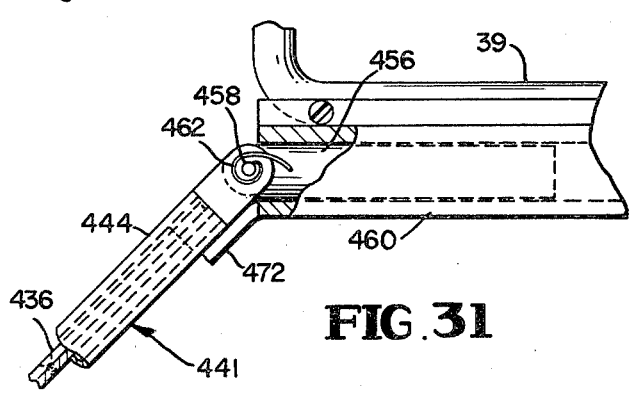
FIG. 30
FIG. 31
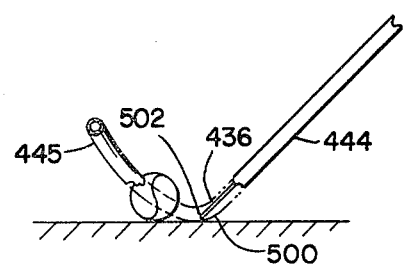
FIG. 32
FIG. 33
FIG. 34

4,221,524

APPARATUS FOR RETRIEVING BALLS

RELATED APPLICATION

This application is a continuation-in-part of my application Ser. No. 767,636 filed on Feb. 10, 1977 for Method and Apparatus For Retrieving Balls, now abandoned.

FIELD OF INVENTION

This invention relates to methods and apparatus for retrieving tennis balls or other similar round balls from a floor or ground surface.

BACKGROUND

In the course of giving a tennis lesson, a large number of tennis balls are frequently used by the student and instructor. For example, between one-hundred and two-hundred balls may be used in a single half hour lesson and remain scattered over the tennis court at the conclusion of the lesson. Students or other players themselves also have the occasion to use a large number of balls in a practice session. As a result, considerable unproductive time and energy is often expended in picking up the balls by hand at the end of a lesson or at the end of a practice session.

Wire form pick-up baskets with a special bottom are sometimes used by instructors and players to reduce, to some extent, the effort required in picking up scattered balls. Such a device, however, is not adequate in that it holds only a relatively small number of balls, is cumbersome to use and requires considerable time to pick up a large number of balls.

SUMMARY AND OBJECTS OF INVENTION

The present invention overcomes the foregoing problems by providing a novel ball-retrieving handcart that is adapted to be propelled along a ground or floor surface with minimal effort to rapidly pick up scattered balls at ground level and conveniently deposit the picked-up balls approximately at the user's waist level where they are within the non-bending, effortless reach of the user.

According to a preferred embodiment of this invention, the ball-receiving handcart operates, as it is advanced over the floor or ground surface, to first collect scattered balls and then to present the collected balls to a conveyor which raises the balls above floor level and then discharges the raised balls into the ball collection receptacle.

The ball-retrieving apparatus of this invention is easy to use and manipulate and is of simplified construction requiring little or no maintenance. Additionally, it operates to rapidly pick up large numbers of balls to afford more productive teaching and practice time.

With the foregoing in mind, a major object of this invention is to provide a novel ball-retrieving handcart adapted to be wheeled along a ground or floor surface to pick up balls scattered over the surface and to raise and deposit them at about waist level for re-use. The ball-retrieving apparatus of this invention therefore eliminates the need for lifting the collected balls by hand to a convenient level for re-use.

Another object of this invention is to provide a novel apparatus and method in which balls scattered over a surface area are first continuously collected and concentrated, then continually picked up at ground level and lifted above the ground surface while continuing to collect the scattered balls, and finally gathered in a group at approximately waist level above the ground or floor surface while continuing to collect, pickup and lift the balls.

Another important object of this invention is to provide a novel ball-retrieving handcart that is efficient in operation and is easy and convenient to handle.

A more specific object of this invention is to provide a novel ball-retrieving handcart wherein the handcart is equipped with apparatus that enables the pick-up of balls hugging or lying closely adjacent to fences, walls, nets or other vertical surfaces.

Although the embodiments of this invention shown in the drawings herein are particularly adapted for retrieving tennis balls, it will be appreciated that the principles of this invention may be applied for retrieving other types of round balls of comparable size, such as baseballs.

Further objects of this invention will appear as the description proceeds in connection with the appended claims and the below-described drawings.

DESCRIPTION OF DRAWINGS

FIG. 6 is a section taken substantially along lines 6—6 of FIG. 3;

FIGS. 7 and 8 are sections taken respectively along lines 7—7 and 8—8 of FIG. 6;

FIG. 9 is a section taken substantially along lines 9—9 of FIG. 6 and shows the lower portion of the ball-lifting conveyor, while

FIG. 13 is a section taken in substantially the same plane as section 12—12 and showing a modification of the ball-synchronizing mechanism;

FIG. 14 is a section taken substantially along lines 14—14 of FIG. 13;

FIG. 15 is a view similar to FIG. 13, but showing the spring biased synchronizing gate pivoted to its jamb-relieving position;

FIG. 17 is a fragmentary perspective view of the ball-lifting conveyor shown in FIG. 16;

FIG. 18 is a section taken substantially along lines 18—18 of FIG. 17;

FIG. 20 is a perspective view of another embodiment of the ball-retrieving handcart of this invention;

FIGS. 21 and 22 are sections taken respectively along lines 21—21 and 22—22 of FIG. 20;

FIG. 23 is a section taken substantially in the same plane as sections 9 and 10 and shows another modification of the ball-lifting conveyor;

FIG. 24 is a fragmentary section of the conveyor shown in FIG. 23 as taken substantially along lines 24—24 of FIG. 23;

FIG. 25 is a fragmentary perspective view of the rear, ball-lifting flight of the conveyor shown in FIG. 23;

FIG. 26 is a section taken substantially along lines 26—26 of FIG. 25;

FIGS. 29, 30, 31 and 32 are sections taken substantially along lines 29—29, 30—30, 31—31, and 32—32 of FIG. 28;

FIG. 33 is a section taken substantially along lines 33—33 of FIG. 30;

FIG. 34 is a fragmentary top plan view of the forward end of the left hand vane-supporting frame shown in FIG. 29;

DETAILED DESCRIPTION

Figure 1:
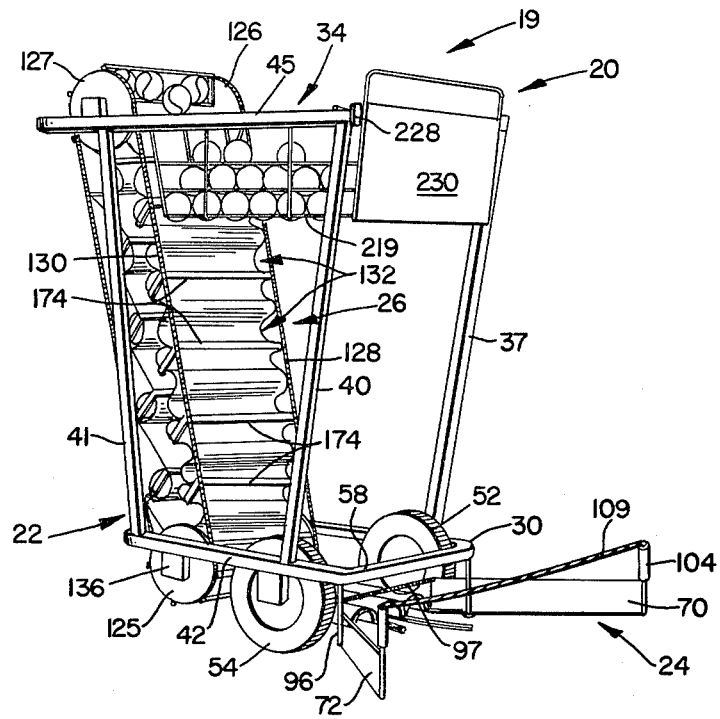
FIG. 1 is a perspective view of a ball-retrieving handcart constructed according to one embodiment of this invention.

In the embodiments shown in the drawings herein the ball-retrieving handcart or ball-retrieving vehicle of this invention is adapted to be rolled or propelled by an attendant or user along a tennis court or other ground or floor surface and operates, as it is advanced, to pick up scattered balls at floor or ground level and to deposit the picked-up balls in the collection receptacle (indicated at 20 in FIGS. 1-3) that is conveniently located approximately at the user's waist level so that the balls in the receptacle are within the non-bending reach of the user.

In the embodiment shown in FIGS. 1-10, the ball-retrieving handcart is generally indicated at 19 and mainly comprises a wheeled, unitary support frame structure or assembly 22, the ball-collection receptacle 20 supported on frame structure 22 at about waist level above the ground, a ball collecting and organizing apparatus or structure 24 mounted on frame structure 22, and an endless, wheel-driven ball conveyor 26 also mounted on frame structure 22. Apparatus 24 collects and organizes balls lying on the ground or floor and delivers them to conveyor 26. Conveyor 26 has several ball-lifting pockets 132 for receiving the balls from apparatus 24 and for raising the received balls to a preselected level at which they are discharged or dumped into receptacle 20.

Frame structure 22 is advantageously lightweight in construction and is shown in the drawings to be a unitary, tubular metal structure. In this embodiment, frame structure 22 comprises a lower, horizontally disposed rectangular frame 30 (see FIG. 6) left and right side frameworks 32 and 33 (see FIGS. 1 and 2), and an upper horizontally disposed frame 34 (see FIG. 5).

The lower and upper frames 30 and 34 are arranged in parallel spaced apart relation, with the upper frame 34 being disposed vertically above the lower frame 30. The side frameworks 32 and 33 extend between the lower and upper frames 30 and 34. Each of the frames 30 and 34 may advantageously be formed from a single length of metal tubing as shown. A rearwardly extending waist-high push handle 36 forms a part of the upper frame 34 as best shown in FIG. 5.

Figure 3:
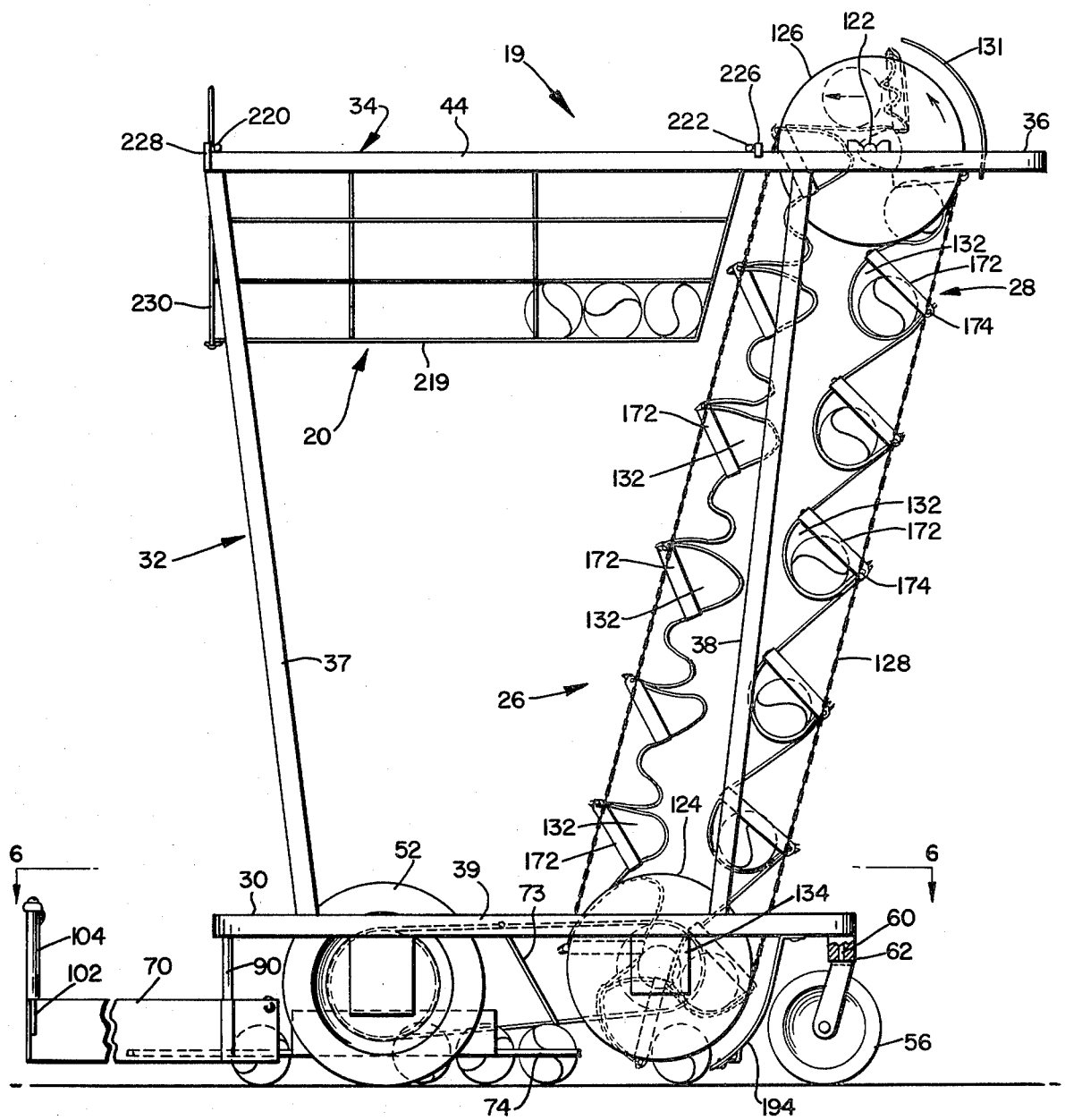
FIG. 3 is a left side elevation of the ball-retrieving handcart shown in FIG. 1.

Referring to FIG. 3 side framework 32 comprises a pair of upwardly diverging structural side frame members 37 and 38 rigidly fixed to and extending upwardly from the lower frame's left-hand side section 39. Framework 33, which is the mirror image of framework 32, also comprises a pair of upwardly diverging structural side frame members 40 and 41 as best shown in FIG. 1. Frame members 40 and 41 are rigidly fixed to and extend upwardly from the lower frame's right-hand side section 42.

Figure 5:
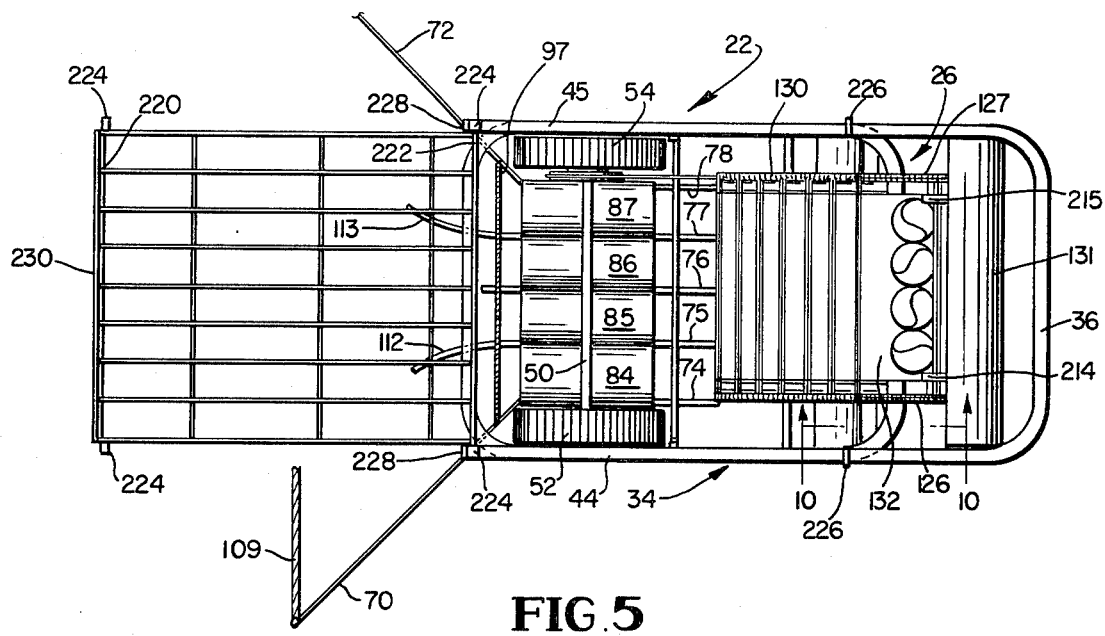
FIG. 5 is a top plan view of the ball-retrieving handcart shown in FIG. 1 and shows the ball collection receptacle in a forwardly displaced position.

Referring to FIGS. 1, 3 and 5, the upper frame 34 has a U-shaped configuration in which the legs define a pair of parallel, spaced apart, horizontally extending side rails 44 and 45. Receptacle 20 is removably supported on rails 44 and 45. The ball-retrieving body of receptacle 20 lies between rails 44 and 45 and is open at the top to receive balls discharged from conveyor 26. The upper ends of frame members 37 and 38 are rigidly joined or fixed to rail 44 at the underside thereof. The upper ends of frame members 40 and 41 are similarly rigidly joined or fixed to rail 45 at the underside thereof.

As shown in FIG. 5, rails 44 and 45 extend rearwardly and are integrally joined by a cross portion which forms handle 36. With this construction, handle 36 is disposed rearwardly of the main body of frame structure 22 and the parts mounted thereon so that it can conveniently be grasped by the user. The location of handle 36, the configuration of frame structure 22 and the location of operating equipment on the frame structure are so selected and arranged to permit the user to push handcart 19 with a normal stride without kicking or stepping on the frame or the equipment mounted thereon.

In this embodiment, a three-wheel support is provided for frame structure 22 and comprises a pair of ground-engaging wheels 52 and 54 and a ground-engaging caster 56. Wheels 52 and 54 are rotatably mounted on a non-rotatable, transverse front axle 50.

Axle 50, which is non-rotatably mounted on the lower frame 30 near the forward end thereof, lies horizontally at the level below frame 30. As shown, axle 50 is disposed a short distance rearwardly of the lower frame's front section 58.

Wheels 52 and 54 are confined against axial displacement on the axle by any suitable means and are within the perimeter defined by the lower frame 30 just inwardly of the lower frame's side sections 39 and 42 so that they are near the forward or front corners of frame 30.

Caster 56, as shown in FIGS. 3 and 6, is also supported from the lower frame 30 and is pivotable about the vertical axis of a post 60 which is journalled in a journel block 62. Block 62 is rigidly fixed to and supported from the transverse rear section 64 of frame 30 and is preferably located centrally or midway between the lower frame's side section 39 and 42 so that it does not interfere with the user walking behind and pushing handcart 19.

From the foregoing description, it is clear that frame assembly 22 is supported at its forward end by wheels 52 and 54 and at its rearward end by caster 56.

Ball-collection and organizing apparatus 24 comprises a pair of pivotally-mounted, spring-biased ball-collection vanes 70 and 72 (see FIGS. 1 and 5), a pivotable gate 73 (see FIG. 7), and a selected number of rigid, horizontally disposed structural spacer rods, of which there are five in this embodiment as indicated at 74, 75, 76, 77 and 78 in FIG. 6. Spacer rods 74–78, as will be described in detail shortly, define parallel side-by-side ball-receiving channels (indicated at 83 in FIG. 7), that position and organize the balls on the ground for presentation to conveyor 26. Spacer rods 74–78 longitudinally organize the balls for presentation to conveyor 26 and keep the balls from randomly congesting in the pickup area of conveyor 26, thereby providing a more smooth and reliable pickup by the conveyor. Gate 73 transversely organizes the balls for presentation to the conveyor. Vanes 70 and 72, as will be described later, project forwardly of frame structure 22 to collect and concentrate scattered balls for presentation to guide channels 83.

Referring to FIGS. 6 and 7, spacer rods 74–78 are rigidly secured to and supported from frame 30 by axle 50 and a support bracket 80. As shown, spacer rods 74–78 have parallel, coextensive, straight, uniformly spaced apart sections 79 extending longitudinally of frame structure 22. Preferably, spacer rods 74–78 are symmetrically arranged with respect to a vertical, longitudinal plane medially intersecting frame structure 22 and conveyor 26 to evenly distribute the balls to conveyor 26 for pickup. Spacer rods 74–78 are disposed at a common horizontal level that is spaced above the ground or floor by a distance slightly greater than the radius of a tennis ball. The rearward ends of spacer bars 74–78 terminate just forwardly of the lower end of conveyor 26 as shown. The uniform spacing between the adjacently disposed sections 79 of spacer rods 74–78 is slightly greater than the diameter of a tennis ball as shown.

Each pair of adjacently disposed spacer rods 74–78 thus defines one guide channel 83 (see FIG. 7) for receiving balls in the course of relative movement between handcart 19 and the stationary balls on the floor or ground. Four such guide channels are therefore defined in this embodiment to organize the balls in as many as four straight rows that extend normal to the conveyor pickup stations 28. It will be appreciated, however, that this invention is not limited to four guide channels, and that any suitable number of guide channels may be provided for.

As best shown in FIG. 7, semi-circular tunnel sections 84, 85, 86 and 87 may be employed with spacer rod sections 79 to provide each channel 83 with a tunnel-like configuration. These tunnels are open at their forward ends to receive the balls and at their rearward ends to present the balls to conveyor 26. Sections 84–87 are each arranged between and bridge adjacent spacer rod sections 79. The diameters of tunnel sections 74–78 are uniform and slightly greater than that of a tennis ball to provide further guidance for the balls in the course of relative movement between the balls and handcart 19.

As best shown in FIGS. 3, 5 and 6, vanes 70 and 72 are fixed at their rearward ends to vertical posts 90 and 96, respectively. Posts 90 and 96 are pivotally secured to and depend from frame 30 at the front corners thereof. Vanes 70 and 72 are thus mounted to swing about parallel vertical axes in a common horizontal plane above the ground or floor surface.

As shown in FIG. 6, a spring 97 connected to and extending between rearward ends of vanes 70 and 72 biases the vanes away from each other and in opposite directions to extreme outwardly diverging positions where they respectively abut against rigid frame-mounted stops 94 and 100. As viewed from FIG. 6, stop 94 limits counterclockwise rotation of vane 70, and stop 100 limits clockwise rotation of vane 72. In their illustrated, extreme positions, the included angle between each vane and a vertical longitudinally extending plane medially intersecting frame structure 22 is about 45 degrees to make the maximum included angle between vanes 70 and 72 about 90 degrees.

By projecting forwardly from frame structure 22, vanes 70 and 72 funnel or deflect balls on the ground into the entrance mouths of channels 83 in the course of relative motion between handcart 19 and the balls on the ground. By diverging or flaring outwardly, vanes 70 and 72 present a wide ball-receiving mouth to define a ball-collection path that is considerably wider than the width of conveyor 26. With this construction, the number of runs required by handcart 19 to cover a given area is reduced, and correspondingly reduces the time needed to pick up balls that are scattered over a relatively large area such as a tennis court.

Since vanes 70 and 72 are swingable against the bias exerted by spring 97, each vane will pivot or swing inwardly against the spring-bias upon coming into contact with a fence or other vertical wall surface. This action enables handcart 19 to be driven closely adjacent to and along side of a fence or other vertical wall surface to pick up the balls hugging or lying adjacent to the vertical surface.

As shown in FIG. 3, a vertical post 102 is advantageously fixed on vane 70 adjacent to its leading or forward edge, and a roller 104 is mounted on post 102 for rotation about the post's vertical axis. This construction prevents vane 70 from being driven into and catching in openings or apertures in such obstacles as chain link fences or tennis court nets. The rollers 104 upon engaging a fence, wall or other vertical surface will smoothly guide the vane along the vertical surface and enable vane 70 to skid along a fence or other vertical surface to scoop in and capture balls hugging the vertical surface. For the same purposes, a vertical post 106 rotatably mounting a roller 108 is mounted on vane 72 adjacent to the vane's forward or leading edge as best shown in FIG. 2.

Figure 2:
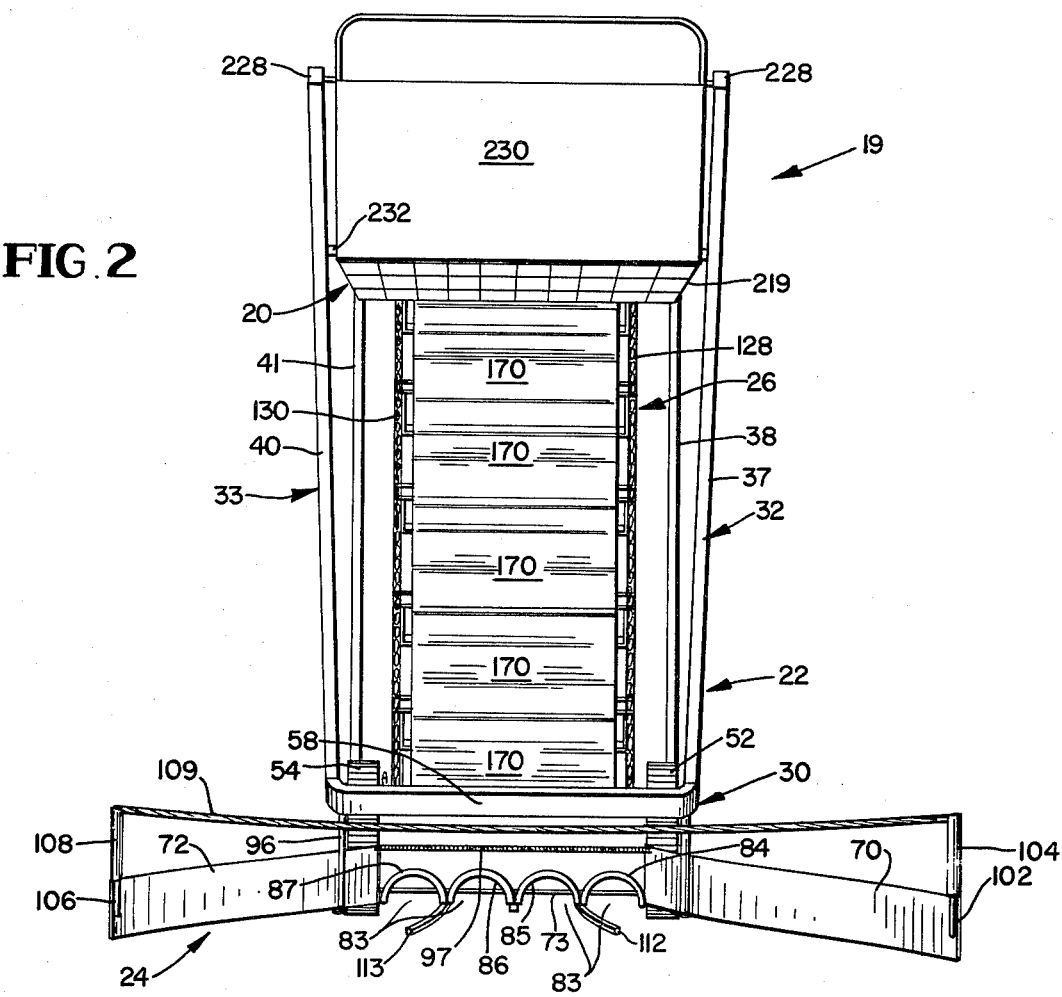
FIG. 2 is a front elevation of the ball-retrieving handcart shown in FIG. 1.

As shown in FIGS. 1 and 2, a flexible cable 109 such as a nylon cord or tubing, is secured at opposite ends to posts 102 and 106. When vanes 70 and 72 are in their extreme, illustrated positions, cable 109 is pulled horizontally taut across the mouth defined by the vanes at a level above the balls on the ground to keep posts 102 and 106 from snagging in a tennis court net or other opening or obstruction.

As shown in FIG. 6, the forward end portions of the two outboard spacer rods 74 and 78 are flared outwardly at 111 to align with vanes 70 and 72, respectively, when the vanes are in their extreme illustrated positions. The forward ends of these outwardly flared spacer rod portions lie closely adjacent to the rearward ends of vanes 70 and 72 to form continuations of the vanes and to prevent captured balls from escaping in regions where they could become lodged or wedged between either of the wheels 52 or 54 and the handcart's frame. The two intermediate spacer rods 75 and 77, respectively terminate in end portions 112 and 113 which are also flared or outwardly divergent and which project forwardly of frame 30 by a lesser distance than vanes 70 and 72 as shown. The angle of divergency that each of the end portions 112 and 113 makes with the frame structure's longitudinal axis of symmetry is somewhat less than the angle at which vanes 70 and 72 intersect the longitudinal axis of symmetry. As shown, the centrally disposed spacer rod 76 is straight and also projects forwardly beyond frame 30, but only by a relatively short distance that is less than the distance by which spacer rods 75 and 77 project beyond the frame.

The foregoing spacer rod construction provides channels 83 with widened, outwardly divergent, funnel-like entrance mouths having effective ball-receiving dimensions that are greater than the guide channels widths between spacer rod sections 79. This construction expedites the collection of balls and minimized unproductive, random collisions of the balls against the forward ends of spacer rods 74–78, which may otherwise occur before the balls properly register with and enter channels 83.

As shown in FIG. 6, gate 73 is disposed between the exit ends of tunnels sections 84–87 and extends to right angles to rods 74–78 to span channels 83. Gate 73 is pivotally mounted on lower frame 30 for swinging movement about a horizontal, transverse axis that extends perpendicularly of the spacer rods. Gate 73 is so weighted that it is normally swung downwardly to its illustrated, vertical position where it extends across channels 83 to block delivery of the balls to conveyor 26.

The weight of gate 73 is great enough to prevent one ball in one or more of the channels 83 from lifting it in the course of relative motion between handcart 19 and the balls. However, when a plurality of balls (such as three or more, for example) accumulates in a row in at least one of the channels 83 a strong enough force is exerted by the balls in the course of relative motion between handcart 19 and the balls to lift gate 73 (that is, to swing it upwardly) to its open position where it allows delivery of balls to conveyor 26.

Gate 73 therefore has the effect of lining up and dressing the balls in channels 83 in straight rows across the channels so that the balls in channels 83 will be delivered to conveyor 26 in straight, transverse rows. Gate 73 performs an additional function that will be described later on.

From the foregoing description it will be appreciated that vanes 70 and 72 capture, collect and concentrate scattered balls for entry into channels 83, spacer rods 74–78 organize the captured balls into straight, parallel longitudinally extending rows in channels 83, and gate 73 organizes the balls in channels 83 into straight transverse rows parallel to the conveyor pockets 132, all in the course of relative movement between handcart 19 and the balls lying on the surface.

Referring to FIGS. 1–5, conveyor 26 comprises a lower and upper sprocket wheel-mounting shafts 120 and 122, sprocket wheels 124, 125, 126 and 127 and a pair of endless, sprocket wheel drive chains 128 and 130 for mounting pockets 132.

Shaft 120 is supported from lower frame 30 and is mounted for rotation at opposite ends in support journal members 134 and 136 which are rigidly fixed to the frame side sections 39 and 42, respectively. Shaft 120 is rotatable about a horizontal axis that is parallel to the axis of axle 50 and spaced rearwardly from axle 50 near the rear of lower frame 30 and just forwardly of the connection of frame members 38 and 41 to frame 30. Sprocket wheels 124 and 125 are non-rotatably mounted on shaft 120 near opposite ends thereof. As shown, sprocket wheels 124 and 125 are located between the lower frame's side sections 39 and 42. The upper conveyor shaft 122 is non-rotatably mounted on the upper frame 34. The axis of shaft 122 is parallel to that of shaft 120 and lies between handle 36 and the connection of the upper ends of frame members 38 and 41 to side rails 44 and 45.

Sprocket wheels 126 and 127 are rotatably mounted on shaft 122 near opposite ends thereof and are located between side rails 44 and 45 as shown. Chain 128 is trained around and engages sprocket wheels 124 and 126, and chain 130 is trained around and engages sprocket wheels 125 and 127. A projecting shroud 131 is mounted on frame 34 along the upper end of conveyor 26.

As shown in FIG. 3, shaft 122 is rearwardly displaced with respect to shaft 120 so that conveyor 26 is rearwardly inclined, with the assembly of shaft 120 and sprocket wheels 124 and 125 being disposed forwardly of the lower frame's rear section 64 where it does not interfere with the user as he pushes handcart 19 from behind. Additionally, the assembly of shaft 122 and sprocket wheels 126 and 127 are located forwardly of handle 36 and hence out of the user's way. Handle 36 is displaced rearwardly of frame 30 by a sufficient distance that keeps the user from stepping on frame 30 or any of the parts mounted on frame 30. Frame members 38 and 41, being rearwardly and upwardly inclined, act as compressive columns that are almost in line with a line normally intersecting shafts 120 and 122. Frame members 38 and 41 thus provide a sturdy support to resist forces tending to buckle the frame assembly. Chains 128 and 130 are thereby kept from relaxing and jumping their sprocket wheels during use.

Referring to FIGS. 6 and 8, the drive for conveyor 26 is taken from wheel 54 by means of a pawl and ratchet assembly 144 and a belt and pulley drive assembly 146. Assembly 144 comprises a spring-biased pawl 148 and a ratchet wheel 150. Assembly 146 comprises a pair of pulleys 152 and 154 and an endless belt 156.

Pulley 152 is coaxially rotatably mounted on axle 50 adjacent to wheel 54 and is non-rotatably fixed to wheel 54 by suitable fastening members 158. Pulley 154 is rotatably mounted on the lower conveyor shaft 120, and belt 156 is trained around pulleys 152 and 154 so that rotation of wheel 54 is transferred to pulley 154. Ratchet wheel 150 is non-rotatably mounted on shaft 120 adjacent to pulley 154. Pawl 148 is fixed on the side of pulley 154 and is spring-biased into engagement with ratchet wheel 150 to transfer rotation of pulley 154 to ratchet wheel 150 and hence to shaft 120.

When handcart 19 is pushed forwardly, pawl 148 is biased into drive engagement with ratchet wheel 150 to drive connect pulley 154 to shaft 120. As a result, conveyor shaft 120 will be rotated to advance drive chains 128 and 130 and, hence, the pickup pockets 132 mounted on chains 128 and 130, causing the rearward flight of conveyor 26 to move upwardly, and the forward conveyor flight to move downwardly. Pockets 132 open upwardly to cradle balls as they advance upwardly along the rearward conveyor flight. During downward advancement along the conveyor's forward flight, pockets 132 open downwardly.

Upon reversing direction of handcart 19 to move it rearwardly, pawl 148 operatively disengages from ratchet wheel 150 to interrupt the drive connection between pulley 154 and shaft 120. As a result, transmission of power to conveyor 26 is terminated so that the conveyor will not be driven while handcart 19 is propelled in a rearward direction. This action prevents operation of conveyor 26 in the reverse direction in which the rearward conveyor flight of the conveyor would reverse direction to cause balls in conveyor pockets 132 to drop back onto the ground should it become necessary to back up handcart 19.

From the foregoing it will be appreciated that the pawl and ratchet assembly 144 acts as a one-way or unidirectional clutch to power conveyor 26 from wheel 54 when handcart 19 is forwardly advanced, but to interrupt the transmission of power to conveyor 26 when handcart 19 is rearwardly propelled. It will be appreciated that any suitable unidirectional clutch-like mechanism may be employed for drive connecting either wheel 52 or wheel 54 to shaft 120 when handcart 19 is advance forwardly and to interrupt the drive connection when the handcart is rolled rearwardly.

Referring to FIGS. 2, 4, 9 and 10, each of the conveyor pockets 132 in this embodiment is formed by a sheet of suitable flexible material 170 and is provided with a spacer bar 172. Additionally, there are a plurality of pickup cross bars 174, one for each of the pockets 132. In this embodiment, sheet 170 is non-elastically deformable and may be rubber or suitable plastic material such as polypropylene. The pockets 132 formed by sheets 170 are wide enough to hold a number of balls abreast, corresponding in number to the number of channels 83.

As shown, each cross bar 174 horizontally spans the space between chains 128 and 130 and is secured at opposite ends to chains 128 and 130. Each cross bar 174 defines the leading edge of one pocket 132 and is parallel to the axes of shafts 120 and 122. Cross bars 174 are uniformly spaced apart along chains 128 and 130.

The pocket-defining sheet 170 is secured at its leading and trailing edges to adjacently disposed cross bars 174 so that each sheet lies between and spans the space between each pair of adjacently disposed cross bars. With this arrangement the adjacent, trailing and leading edges of successive pocket-defining sheets are secured to the same cross bar as shown. Any suitable means, such as fastening elements 180, may be employed to secure the pocket-defining sheets to their respective cross bars 174. The length of each pocket-defining sheet 170 is greater than the spacing between adjacent cross bars 174 so that sheet 170 is folded partially to define a ball-receiving recess.

The spacer bars 172 are pivotally mounted one on each cross bar 174. The spacer bar for each pocket guarantees a minimum, unobstructed pocket opening for receiving balls and also for discharging the picked up balls upon raising them to a discharge level above receptacle 20. Additionally, each spacer bar 172 closes the laterally open sides of its associated pocket to keep balls from falling out of the sides of the pocket.

To accomplish the foregoing functions, each spacer bar 127 is formed with a U-shaped configuration having a pair of parallel spaced apart leg portions 182 and 184 and a cross portion 186 extending between and integrally joining leg portions 182 and 184. Each cross bar 174 extends through aligned apertures in the leg portions 182 and 184 of its associated spacer bar to pivotally mount the spacer bar. Accordingly, each of the spacer bars 172 is pivotally supported on its associated cross bar 174 for pivotal or swinging movement about the cross bar's horizontally extending, longitudinal axis.

The cross portion 186 of the spacer bar for each pocket 132 is secured by suitable fastening elements 188 to its associated pocket-defining sheet 170 at a preselected region intermediate the leading and trailing ends of the pocket-defining sheet. The region at which cross portion 186 is secured to its pocket-defining sheet 170 is so selected that as the pocket travels upwardly from the place where it receives one or more of the balls to the place where the balls are discharged from the pocket, the spacing between leg portions 182 and 184 and the bottom 190 of the ball-receiving pocket will be less than the diameter of the ball to prevent the balls from laterally falling out of the pocket as they are raised along the rearward flight of the conveyor 26.

The region at which cross portion 186 is secured to its pocket-defining sheet 170 is also selected to make the ball-receiving mouth of pocket 132 wide enough at the point of ball reception to smoothly receive the balls without obstruction. Finally, the region at which cross portion 186 is secured to the pocket-defining sheet is so selected that the ball-receiving portion of the pocket is deep enough to hold the received balls and to thereby prevent premature discharge of the balls before the pocket reaches its discharge position at the top of the conveyor 26. The developed length of sheet 170 is also preselected to assure smooth unobstructed entry of balls into pocket 132 and also smooth unobstructed discharge of received balls from the pocket.

Instead of employing separate plastic sheets (170) to form the conveyor pockets 132, it will be appreciated that a single plastic or rubber sheet may be employed to form all of the ball-receiving pockets in conveyor 26.

Figure 9:
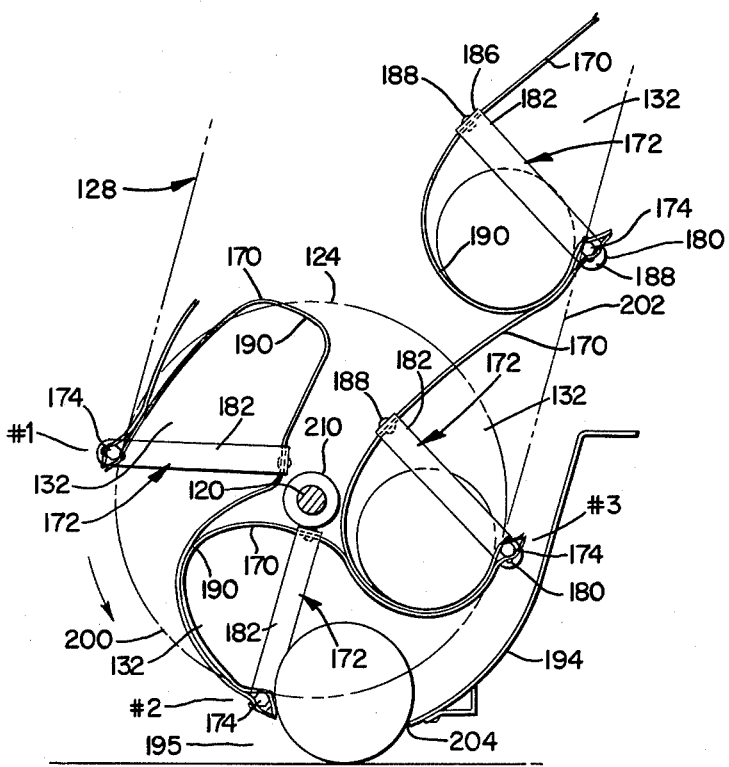

As best shown in FIG. 9, a rigid backstop or ramp 194 formed from sheet metal or other suitable material is rigidly mounted on lower frame 30 to cooperate with cross bars 174 for lifting or picking up balls at ground or floor level and for introducing them into pockets 132 as conveyor 26 is driven by forward advancement of handcart 19. As will be described in detail shortly, each cross bar 174, as it advances through a pickup zone 195, engages any balls lying in the pickup zone to urge them up onto the forwardly facing guide surface of backstop 194, and from there into one of the pockets 132. Backstop 194 is disposed just rearwardly of the lower rearwardly facing portion of conveyor 26 such that its balls guiding surface is spaced rearwardly by a uniform distance from the path along which cross bars 174 travel as they are advanced upwardly through the conveyor's lower turn-around region 200 and the lower portion of the conveyor's straight rear flight 202.

Still referring to FIG. 9, backstop 194 terminates in a straight, forwardly facing, ball-engaging edge 204 that extends parallel to cross bars 174. Edge 204 is raised above floor or ground level by a distance that is significantly less than the radius of a tennis ball so that it will engage the tennis balls well below their centroids.

Conveyor 26 is positioned in such a manner that the path followed by cross bars 174 in the conveyor's lower turn-around region 200 is significantly below the centroid of balls lying on the ground in the area where the cross bars approach and pass through an axis or line normally intersecting the axes of shafts 120 and 122. Thus, as each cross bar 174 is advanced through the lower turn-around region 200 it will engage balls lying in the pickup zone 195 below the centroid of the balls to urge them into abutment with the backstop's forward edge 204. The backstop's forward edge 204 is spaced rearwardly of the line normally intersecting the axes of shafts 120 and 122 by such a distance that the ball will be engaged by both the backstop's forward edge 204 and one of the cross bars 174 when the cross bar reaches a position where the line normally intersecting the axes of shafts 120 and 122 also normally intersects the cross bar. As a result, each cross bar, upon arriving at this pickup position, cooperates with the backstop's forward edge 204 to exert an upward camming or lifting force on the ball or balls trapped between the cross bar and forward edge 204 to lift the balls up onto the ball guiding surface of the backstop.

Each cross bar 174 will remain in contact with the balls below their centroids upon lifting the balls onto the backstop to push the balls upwardly. When the balls reach a position on the backstop's ball guiding surface where the cross bar behind them passes over center with respect to the centroids of the balls, the cross bar will roll the balls into the adjacent conveyor pocket 132.

As shown in FIGS. 6 and 9 the hubs of sprocket wheels 124 and 125 (as indicated at 210 and 211) are large enough to engage the cross portion 186 of each of the spacer bars 174 as it approaches or arrives at a position just entering the conveyor's lower turn-around region 200. This position indicated at position #1 in FIG. 9.

Engagement of the spacer bar's cross portion 186 with hubs 210 and 211 causes the spacer bar to momentarily pivot downwardly around the point of engagement with the hubs to widen or expand the mouth of the associated pocket 132. This camming action of hubs 210 and 211 guarantees that the mouth of the ball-receiving pocket 132 is opened wide enough to receive balls lying in the pickup zone 195.

Upon advancing from position #1 to a location approaching position #2 (see FIG. 9) each cross bar 174 will engage any balls delivered to the pickup zone 195 to urge the balls toward the forward edge 204 of backstop 194. Thus arrival of the cross bar at position #2 drives the balls ahead of it into engagement with the backstop's forward edge 204 to lift the balls trapped therebetween onto backstop edge 204. Continued advancement of each cross bar 174 from position #2 to a position #3 (see FIG. 9) pushes the balls ahead of it along backstop 194. As the cross bar approaches position #3 it moves over center with respect to the centroids of the balls so that at position #3 the balls will be urged into and cradled by the adjacent conveyor pocket.

Figure 10:
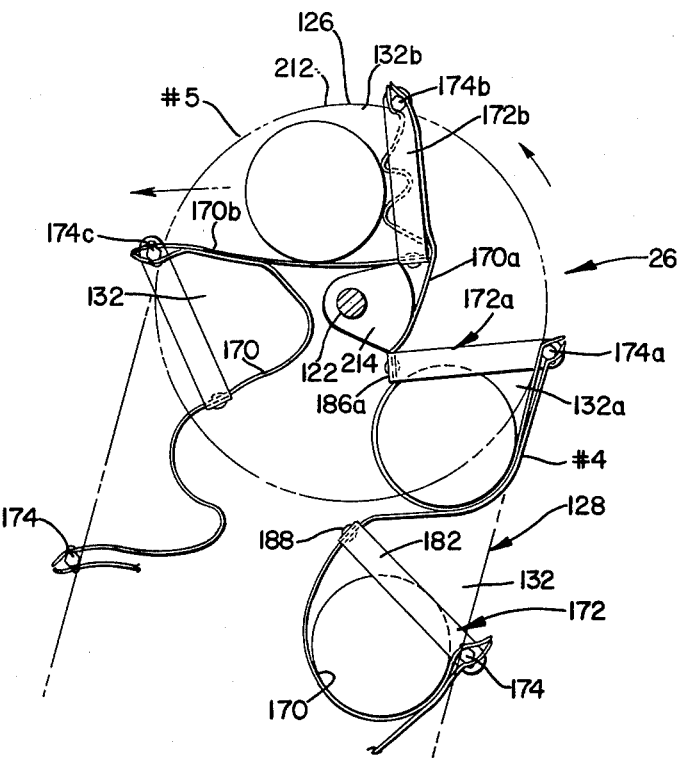
FIG. 10 is a section taken along line 10—10 of FIG. 5 and shows the upper portion of the ball-lifting conveyor in FIG. 1

The balls received in the pockets 132 along the conveyor's rearward flight are thus lifted upwardly toward the conveyor's upper turn-around region which is indicated at 212 in FIG. 10.

Figure 4:
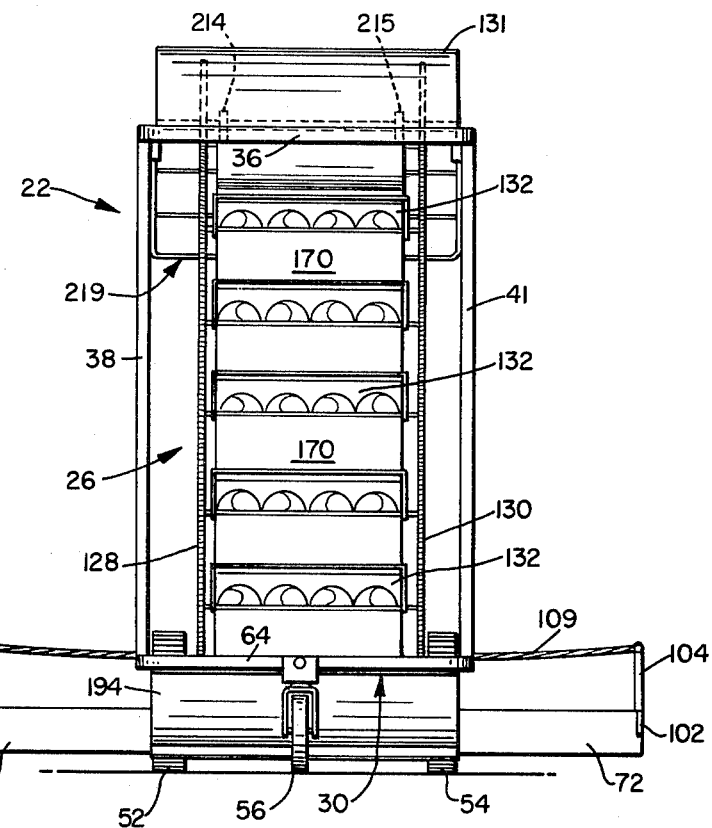
FIG. 4 is a rear elevation of the ball-retrieving handcart shown in FIG. 1.

Referring to FIGS. 4 and 10, a pair of cams 214 and 215 are fixed on shaft 122 to engage the cross portion 186 of each spacer bar 172 upon its arrival at a position #4 (see FIG. 10) where it approaches or just enters the conveyor's upper turn-around region 212.

To describe the effect of cams 214 and 215 on each spacer bar 172, reference is made to the adjacently disposed pockets respectively arriving at positions #4 and #5 as shown in FIG. 10. The leading pocket arriving at position #5, where discharge of the balls takes place, is indicated at 132b and the next pocket arriving at position #4 is indicated at 132a. To distinguish the parts of pockets 132a and 132b from each other, pocket-defining sheets (170) for pockets 132a and 132b are respectively indicated at 170a and 170b, and the spacer bars (172) for pockets 132a and 132b are respectively indicated at 172a and 172b. Additionally, the three successive cross bars (174) associated with pockets 132a and 132b are indicated at 174a, 174b and 174c.

When the spacer bar 172a for pocket 132a rises to position #4, its cross portion catches against cams 214 and 215 in such a way that the cams retard upward advancement of the cross portion relative to the advancing cross bar 174a on which spacer bar 172a is mounted. This action causes the leading portion of the pocket-defining sheet 170a between the cross portion spacer bar 172a and cross bar 172b to be pulled taut upon arrival of pocket 132a at position #4. Upon being pulled taut this leading portion of sheet 170a applies an impact force against the adjacent trailing portion of sheet 170b. This trailing portion of sheet 170b will be in its relaxed state as shown since the cross portion of spacer bar 172b will have moved to the upper edge of cams 214 and 215 upon arriving at position #5. The force applied by pulling the leading portion of sheet 170a taut is therefore transmitted to the balls in pocket 132b to forcibly eject the balls forwardly from the pocket into receptacle 20. Position #5, it will be noted, is at a higher level than receptacle 20 so that the ejected balls will be dumped into the receptacle.

It also will be noted that engagement of the cross portion of spreader bar 172b with the upper edge of cams 214 and 215 causes the leading portion of sheet 170b between the cross portion of spreader bar 172b and cross bar 172c to be pulled taut when pocket 132b arrives at position #5 to present a stiffened platform along which the balls roll out of pocket 132b upon application of the ejection force from the tensioned, leading portion of sheet 170a.

It will be appreciated that each of the pockets 132 undergo the same action as that just described for pocket 132a upon their arrival at position #4, and that each pocket furthermore undergoes the same action as that just described for pocket 132b upon arriving at position #5. Accordingly, when each of the pockets 132 arrives at position #5, the balls therein will be ejected from the pocket to enter receptacle 20 under the force applied by the tensioned sheet in the following pocket.

After the cross portion of each spacer bar rides over the upper edge of cams 214 and 215 both the leading and trailing flexible pocket walls will relax as shown in FIG. 10. Following discharge of the balls, it is understood that each of the pockets 132 advances down the forward flight of conveyor 26 to position #1 (FIG. 9) preparatory to picking up additional balls.

As shown in FIGS. 1-5, the receptacle 20 may be a wire form basket 219 having parallel, spaced apart transverse support bars or rods 220 and 222. Rods 220 and 222 are disposed at the upper edges of the basket's front and rear walls and span the space between rails 44 and 45 to support the basket from the side rails. Rollers 224 mounted on rods 220 and 222 and riding on rails 44 and 45 permit basket 219 to easily be moved forwardly and rearwardly along the rails. Basket 219 may be removed from frame structure 22 simply by lifting it upwardly. The depth of basket 210 is pre-selected to preferably hold three to more layers of balls.

Upstanding stops 226 mounted on rails 44 and 45 are engageable with the rollers on rod 222 to limit rearward displacement of basket 219 along the rails. Additionally, upstanding stops 228 mounted on the forward ends of rails 44 and 45 are abuttable with the rollers on rod 220 to limit forward displacement of basket 219 along the rails.

The front wall of basket 219 is indicated at 230 and may optionally be pivotally mounted on rod 220 to act as a gate that is swingable about a horizontal axis, between open and closed positions. A snap latch 232 is mounted on the front wall gate 230 to engage a part on one of the basket's other walls for releasably retaining the front wall gate in its closed position.

When it is desired to dump the balls collected in basket 219, the forward edge of the basket is lifted by the user to clear the forward stops 228. Basket 219 may then be pulled forward to a position projecting beyond rails 44 and 45 where the rollers on rod 222 lie on rails 44 and 45 in engagement with the rearwardly facing edges of stops 228. In this position basket 219 then can be tipped or tilted downwardly to dump the balls out of the basket upon opening the front wall gate 230. This convenience enables the balls to easily be dumped into a hopper of a ball-throwing gun or other receptacle.

During operation, some balls lying in the pickup zone 195 may be kicked back toward channels 83 by the travelling cross bars 174. Gate 73, however, will prevent these balls from reentering the tunnel sections of channels 83.

Figure 11:
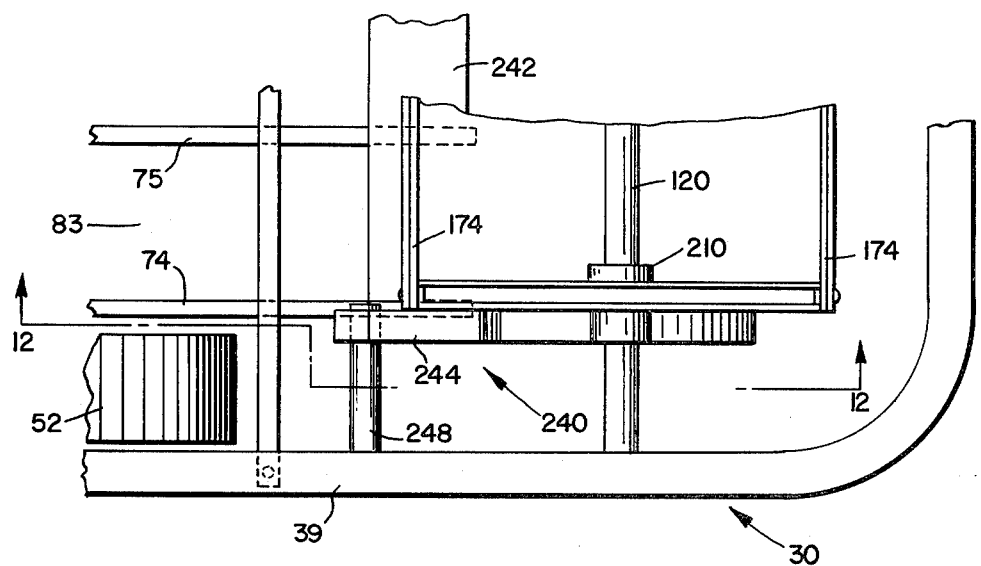
FIG. 11 is a fragmentary section taken in the same plane as FIG. 6 and shows an optional ball-synchronizing mechanism.
Figure 12:
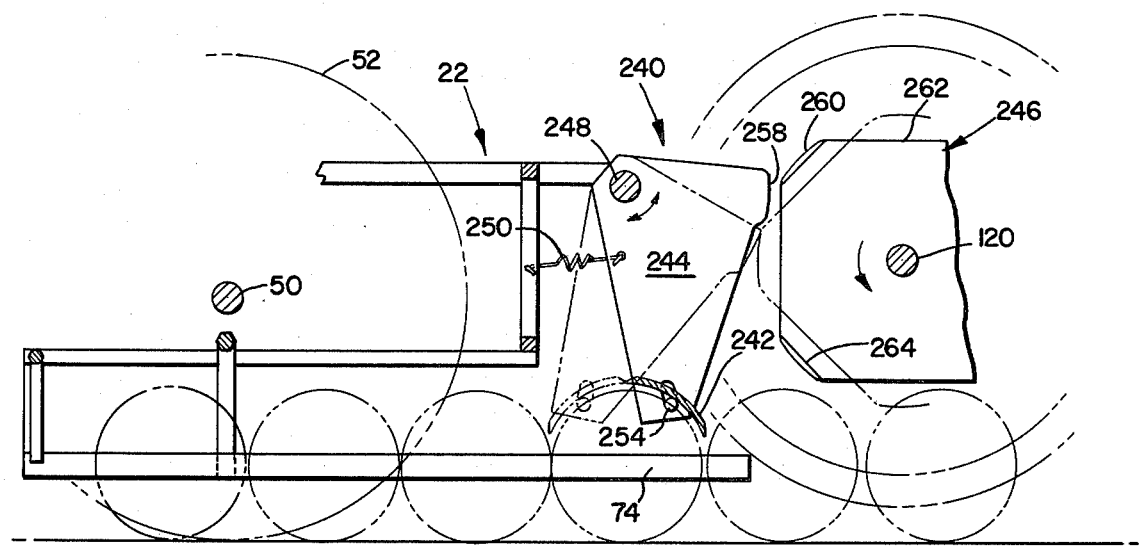
FIG. 12 is a section taken substantially along line 12—12 of FIG. 11.

In the course of urging balls lying in the pickup zone 195 rearwardly toward backstop 194, cross bars 174 may occasionally act along a line of force that tends to jamb the balls against the ground to interfere with the smooth, bump-free operation of handcart 19. To avoid this condition, handcart 19 may optionally be equipped with a synchronizing mechanism 240 in place of gate 73 as shown in FIGS. 11 and 12.

Mechanism 240 comprises an arcuate gate 242, a gate-supporting rocker arm 244, and a cam 246. Gate 242 extends transversely between the lower frame's side sections 39 and 42 and spans the exit ends of channels 83. Rocker arm 244 is pivotally mounted on a non-rotatable horizontal shaft 248 that is rigidly on frame 30. Rocker arm 244 is swingable about the shaft's horizontal axis which is parallel to and spaced forwardly of shaft 120. A spring 250 connected to rocker arm 244 and anchored to frame 30 biases arm 244 in a clockwise direction as viewed from FIG. 12. Clockwise pivotal motion of rocker arm 244 about shaft 248 may be limited by a frame-mounted stop.

Gate 242 is secured to the lower end of rocker arm 244 by a pin and elongated slot connected 254. Connection 254 provides a scotch yoke indexing motion of gate 242 that enables gate 242 to follow the uniformly diametered contour of a tennis ball as rocker arm 244 is pivoted counterclockwise from its solid line position as viewed from FIG. 12. The curvature of gate 242 is uniformly diametered, and the angle included between the forward and rearward ends of the gate is less than 90 degrees.

As shown, rocker arm 244 has a rearwardly extending section that terminates in an arcuate cam-engaging edge 248.

Cam 246 is coaxially fixed on shaft 120 for rotation therewith. As shown, the periphery of cam 246 is formed with alternating short cam segments 260 and long cam segments 262, of which there are four short cam segments and four long cam segments, with one long cam segment extending between each pair of adjacently disposed short cam segments. Each of the short cam segments may be defined by a recess-seated, impact-absorbing pad 264 of elastically deformable material, such as rubber. Cam segments 260 and 262 lie along chords of a circle having its center coincident with the rotational axis of shaft 120. The angle included between each long segment 262 and one of the adjacent short segments 260 is 90 degrees.

As handcart 19 is advanced forwardly, cam 246 rotates clockwise (as viewed from FIG. 12) with shaft 120 to bring the short and long cam segments 260 and 262 alternately into engagement with the cam-engaging edge 258 of rocker arm 244. When each long cam segment 262 engages the rocker arm's edge 258, rocker arm 244 will be biased by spring 250 in its extreme clockwise position shown in solid lines in FIG. 12. When each short cam segment 262 engages the rocker arm's edge 258, it pivots rocker arm 244 counterclockwise, as viewed from FIG. 12, to its position shown in dashed lines in FIG. 12.

When rocker arm 244 is in its extreme solid lines position due to engagement with one of the long cam segments 262, gate 242 will be in its closed position (also shown in solid lines) where it captures the balls lying on the ground or floor surface to block the way of the balls to conveyor 26.

When rocker arm 244 is pivoted to its dashed line position by engagement with one of the short cam segments 260, gate 242 is swung to its open position which is also shown in dashed lines in FIG. 12. As gate 242 swings from its closed position towards its open position, connection 254 causes gate 242 to rotate about the centroids of the captured balls to a position where the gate's rearward edge moves over center with respect to the captured balls. As a result, the balls are released from introduction to conveyor 26 in a straight transverse row. Since there are four short and four long cam segments on cam 244, the gate will cyclically open and close four times for each revolution of shaft 120.

Because cam 246 is rotated with shaft 120, the rotation of gate 242 between its opened and closed positions will be synchronized with the advancing cross bars 174 in such a manner that each cross bar 174 entering pickup zone 195 will engage balls released by gate 242 below their centroids. As a result, jamming of balls between the ground or floor surface and spacer bar 174 is avoided.

When gate 242 is in its open position, as shown by the dashed lines in FIG. 12, the gate's forward edge will be below the level of balls in channels 83 to close off the path for the next balls in channels 83. When gate 242 swings back to its closed position, then the next transverse row of balls are allowed to enter the region where they are captured by the gate and retained momentarily against entry into pickup zone 195.

Occasionally, the forward edge of gate 242 may momentarily jamb balls against the floor or ground surface as the gate is swung toward its open position. To avoid this condition, gate 242 may be replaced by the gate structure indicated at 270 in FIGS. 13–15.

Gate structure 270 comprises an arcuate gate member 272 and a pair of end plates 274 and 276. Gate member 272 is pivotally mounted at its rearward end on end plates 274 and 276 by pivot pins indicated at 278. Spring 280 biases gate member 272 into seating engagement with arcuate, recessed ledges which are formed on the inwardly facing sides of end plates 274 and 276, respectively. Gate member 272 is swingable between this position and a raised position about the aligned horizontal axes of pins 278 which extend parallel to the rotational axis of shaft 120.

End plates 274 and 276 are pivotally mounted on short, axially aligned stub shafts 286 to provide for the pivotal displacement of gate structure 270 about a transverse horizontal axis that lies parallel to the rotational axis of shaft 120. The pivot axis of gate member 272 is spaced from the aligned axes of shafts 286 as shown. Shafts 286 are fixed on frame 30 at a level where the aligned axes of shafts 286 are coincident with the centers of balls lying on the surface.

Rocker arm 244 is pivotally secured to end plate 274 by connection 254 at a location spaced from the aligned axes of shafts 286 and the pivot axis of gate member 272 on end plates 274 and 276. Rocking of arm 244 back and forth between its extreme positions under the action of cam 246 swings gate structure 270 between its illustrated closed position and its forwardly rotated open position in the same manner described for gate 242. Gate member 272 has the same contour and dimensions as gate 242 so that it will cup and thereby capture balls in its closed position and will release the captured balls to pickup zone 195 upon being forwardly rotated about the aligned axes of shafts 286 to its open position.

If gate member 272 comes into jamming contact with one or more balls as it swings towards its open position in the manner shown in FIG. 15, it will yield by pivoting upwardly about its pivot axis on end plates 274 and 276 so that it does not wedge the ball against the ground surface or bar the way of the ball.

Instead of employing synchronizing mechanism 240 or other similar apparatus to alleviate any ball-jamming problem at the pickup zone 195, conveyor 26 may be equipped with special non-jamming cross bar assemblies 290 (see FIGS. 16–19) in place of the one-piece, non-yielding cross bars 174. Each cross bar assembly 290 comprises a cross bar member 292 mounted at opposite ends on short arms 294 and 296. Arms 294 and 296 in turn are respectively mounted on spring-biased trunnions 298 and 300. Trunnions 298 and 300 are firmly secured to drive chains 128 and 130, respectively. Cross bar members 292 are parallel to the axes of shafts 120 and 122 and span the space between drive chains 128 and 130.

The assembly of member 292 and arms 294 and 296, which is indicated at 302 in FIG. 17, is thus pivotal about a horizontal axis extending parallel to the rotational axis of shaft 120. The spring bias exerted by the springs on trunnions 298 and 300 yieldably urge assembly 302 in the direction of conveyor pocket advancement so that each cross bar member 292 normally rests against drive chains 128 and 130 forwardly of the horizontal pivot axis 304 at trunnions 298 and 300.

Figure 19:
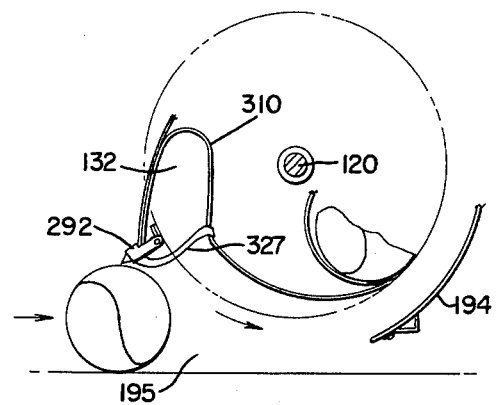
FIG. 19 is a fragmentary section taken substantially along the same plane as FIG. 16, but showing one of the ball-pickup cross bars pivot to its jamb-relieving position.

Thus, each cross bar member 292, upon coming into nonjamming contact with the balls in pickup zone 195, applies a force to the balls along a line lying essentially tangentially to the sprocket wheels 124 and 125 and intersecting axis 304 to force the balls against the backstop's forward edge 204 for pickup. However, if cross bar member 292 comes into jamming contact with one or more balls in pickup zone 195 by acting along a line passing through a centroid of one or more balls, the cross bar member pivots away from drive chains 128 and 130 (in clockwise direction as viewed from FIGS. 16 and 19) against the spring bias exerted by trunnions 298 and 300 as shown in FIG. 19. This motion provides momentary yielding or relief of the jamming force in the course of continued forward advancement of handcart 19 until sufficient forward motion of the handcart redistributes the forces on the ball to normal. Then, cross bar member 292 returns to its normal position against drive chains 128 and 130 under the spring bias exerted by the springs on trunnions 298 and 300.

In the embodiment shown in FIGS. 1–10, the pocket-forming sheet material (170) is sufficiently pliable to tend to conform and yield to the configuration and weight of the balls delivered to the conveyor pockets. Because of this pliable characteristic spreader bars 172 or other suitable equipment are needed to guarantee that the conveyor pocket mouth is kept wide enough for unobstructed entry and discharge of the balls. In the embodiment of FIGS. 16–19, however, spreader bars 172 are eliminated by choosing the pocket-defining sheet material, the pocket-defining sheet dimensions, and the mode of sheet attachment to cross bar members 292 in such a way that the ball-receiving conveyor pockets (indicated at 132' in FIGS. 16–19) maintain their same shape or form throughout their travel in the endless conveyor path.

To the extent that the embodiment shown in FIGS. 16–19 is the same as the embodiment shown in FIGS. 1–10, like reference numerals have been applied to designate like parts.

As shown in FIGS. 16–19, each of the pockets 132' is formed by an elastically deformable sheet 310 having a natural springiness or flexure so that it returns to an original predetermined shape after being deformed. Sheet 310 may be made from a polyolefin or other suitable plastic material. For example, sheet 310 may be made from polyethylene. Alternatively, sheet 310 may be a thin spring steel metal.

In the embodiment of FIGS. 16–19, cross bar members 292 are hollow, rigid, one-piece structural members, each having a rectangular body portion 312 and a wedge-shaped, ball-engaging portion 314 that defines the conveyor pocket's leading edge. Portion 314 is integral with and projects forwardly from body portion 312 in the direction of conveyor pocket advancement.

As shown, portion 314 terminates in a nose 316 that contacts balls lying in pickup zone 195 as the cross bar member advances through the conveyor's lower turn-around region 200 to urge the balls into contact with the backstop's forward, ball-lifting edge 204 and to lift the balls onto backstop 194. As each cross bar member 292 advances along the region of backstop 194 to push the balls upwardly along the backstop, the position is reached where nose 316 rides over-center with respect to the balls ahead of it, causing the forward, inclined face 315 of portion 314 to engage the balls such that a camming action is exerted on the balls to direct them into the adjacent ball-receiving conveyor pocket.

As shown, the back wall 317 of portion 312 is formed with an elongated slot 318 extending the width of the pocket-defining sheet 310. Each slot 318 receives the adjacent terminal ends 320 and 322 of the two sheets 310 defining adjacent conveyor pockets so that the terminal ends are disposed in and concealed with the cross bar member 290. Suitable fastening elements, such as rivits 324, firmly secure the terminal ends 320 and 322 to cross bar member 292. The leading and trailing terminal ends of each sheet 310 are thus respectively secured to two successive cross bar members as shown. With this arrangement, the adjacent trailing and leading ends 320 and 322 of successive pocket-defining sheets are secured to the same cross bar member.

Each cross bar member 292 is mounted in such a manner that its back wall 317 is normal to the endless conveyor path 326 followed by pockets 132' and hence the direction of motion of pockets 132'. Because of this attachment of the elastically deformable sheets 310, the leading and trailing terminal ends 320 and 322 of each sheet 310 lie parallel to motion of pockets 132' along the endless conveyor path 326 so that the terminal ends of the sheets 310 will be aligned in a straight row as the pockets 132' advance along the straight rear and front conveyor flights to extend tangentially of the conveyor's sprocket wheels. By restraining the terminal ends of sheets 310 in this manner, they will be biased in such a way to cause the intermediate portion 328 of the pocket-defining sheet 310 to bow inwardly with respect to the conveyor flights to form pockets 132' and to maintain the shape of pockets 132' throughout the full travel of the pockets around the conveyor's endless path 326. Thus, this ball-receiving pocket construction guarantees a sufficient pocket depth for cradling the balls and a wide enough pocket mouth for receiving and discharging balls at all times without requiring the spacer bars 172 as in the first-described embodiment.

The level of the conveyor's upper turn-around region 212 is selected to be high enough above basket 219' so that as pockets 132' advance around the upper turn-around region and start their downward descent, the balls in pockets 132' will be dumped out of the pockets along a trajectory that aims them into the ball-collection basket. As shown, tapes 327 secured to each pocket-defining sheet 310 and the cross bar 292 at the pocket's leading edge keeps balls from falling out of the sides of the pockets 132'.

In the embodiment shown in FIGS. 20-22, the spacer rods 74-78, tunnel sections 84-87, and the conveyor backstop 194 of the preceding embodiments are eliminated, and a vaned drum and transfer pan assembly 340 is employed for picking up the balls at ground level and presenting them to the ball-lifting conveyor. Additionally, a rotatably mounted shaft 341 is used in place of the stationary front axle 50. To the extent that the ball-retrieving handcart of FIGS. 20-22 is the same or essentially the same as the preceding embodiments, like reference characters have been used to designate the same or essentially the same parts.

Referring to FIG. 20, assembly 340 comprises a vaned drum 342 and a transfer pan 344. Drum 342 is coaxially, non-rotatably mounted shaft 341 just rearwardly of the front section of lower frame 30. Shaft 341 is rotatably mounted on frame 30 by any suitable means and rotates about a horizontal axis extending parallel to that of the conveyor shaft 120.

Wheels 52 and 54 are non-rotatably mounted on shaft 341 near opposite ends thereof. Drum 342 is disposed axially between wheels 52 and 54 as shown.

Drum 342 comprises a cylindrical member 346 and several straight edged ball-engaging vanes 348 projecting radially from member 346. Vanes 348 are uniformly angularly spaced apart about the cylindrical periphery of member 346 and are dimensioned and positioned to engage balls collected by vanes 70 and 72 and to urge the collected balls along the ground or floor surface to a frame-mounted backstop member 350 (see FIG. 21).

Member 350 is similar in construction to backstop 194 and extends partially around the rearwardly directed peripheral region of drum 342 in uniformly spaced apart relation to vanes 348. Balls captured between vanes 348 at ground level are urged by the rotation of drum 342 into engagement with the forwardly facing lower straight edge of backstop member 350 which is at a level below the centroids of the balls on the ground or floor surface. Vanes 348 thus cooperates with the forward edge of member 350 to pick up the balls and to push them upwardly along the partially curved, forwardly directed face of member 350 to a level above pan 344 is handcart 19 is forwardly advanced.

Pan 344 is rigidly mounted on frame 30 and terminates in a straight front edge just rearwardly of and adjacent to the upper edge of backstop member 350 so that balls exiting at the upper end of member 350 are propelled by vanes 348 onto pan 344 as handcart 19 is forwardly advanced.

Pan 344 extends between member 350 and the lower region of the front flight of a ball-lifting, wheel-driven conveyor 352 and downwardly inclined so that balls fed to pan 344 by drum 342 roll down the pan to the lower end of conveyor 352 for delivery to the conveyor's ball-receiving pickup pockets which are indicated at 354. Conveyor 352 is mounted on frame structure 22 and lifts balls from the level of the rearward end of pan 344 to a raised level above receptacle 20 where the balls are discharged into receptacle 20. Except for the construction of pockets 354 and the direction in which they are advanced, conveyor 352 may be the same as conveyor 26, like reference numerals being applied to designate like parts.

The drive for conveyor 352 is taken from either one of the front wheels 52 and 54 and is the same as that described in the first embodiment except that the upper and lower flights of the drive belt 156 in the belt and pulley assembly 146 are crossed so that counterclockwise rotation of one or the other of wheels 52 and 54 imparts clockwise rotation to shaft 120 as viewed from FIGS. 21 and 22. As a result, pockets 354 open upwardly and advance upwardly to lift the balls along the conveyor's front flight.

As shown, a multiplicity of parallel, uniformly spaced apart, horizontally extending cross bars or rods 356 are firmly secured at opposite ends to the conveyor drive chains 128 and 130 to span the space between the drive chains. To form the ball-receiving pockets, a ball-supporting wire form structure 358 is pivotally suspended from each cross rod 356. Accordingly, each of the supporting structures 358 normally hangs vertically behind the conveyor's front flight rearwardly of one of the cross rods 356 as it is advanced upwardly along the conveyor's front flight during forward advancement of handcart 19.

Each of the conveyor pockets 354 is formed by a different one of the support structures 358 in cooperation with the cross rod 356 adjacent to the support structure's fee end in such a way that balls rolling off the rearward end of pan 344 pivot the support structure rearwardly and become cradled between the free end of support structure 358 and the adjacent cross bar 356 as shown in FIG. 23. Side tapes 359 secured to the lower end of each support structure 358 and opposite ends of the adjacent cross rod 356 limit counterclockwise motion of structure 358 and keeps balls from falling out of the sides of the conveyor pocket. In this manner, the cradled balls are lifted to the upper end of the conveyor above the ball-collection receptacle 20.

Each of the ball-supporting structures 358 is urged rearwardly by reception of one or more balls by a sufficient distance that it will be engaged by one or more cams 360 as it enters the upper turn-around region of conveyor 352. Cam 360 is non-rotatably mounted on conveyor shaft 122 and is configured to pivot each ball-supporting structure 358 clockwise (as viewed from FIG. 22) as it enters the conveyor's upper turn-around region. As a result of this camming action, the cradled balls will be pushed or ejected forwardly and thus discharged into receptacle 20.

The embodiment shown in FIGS. 23-26 is the same as that shown in FIGS. 1-10 except that a modified conveyor 370 is employed in place of conveyor 26. To the extent that the embodiments of FIGS. 1-10 and FIGS. 23-26 are the same, like reference numerals have been applied to designate like parts.

In conveyor 370, an array of cross bars 372 and ball-receiving pockets 374, both of modified construction, are employed in place of the cross bar 174, spreader bars 172 and pockets 132 shown in the embodiment of FIGS. 1-10. Additionally, a single ball-discharging cam 376 is employed in conveyor 370 in place of the cams 214 and 215 in the embodiment of FIGS. 1-10. Conveyors 370 and 26 are otherwise the same, like reference numerals being applied to designate like parts.

As shown in FIGS. 23-26, cross bars 372 are each firmly secured at opposite ends to the conveyor drive chains 128 and 130. Cross bars 372 extend horizontally between drive chains 128 and 130 in parallel, uniformly spaced apart relation.

Figure 16:
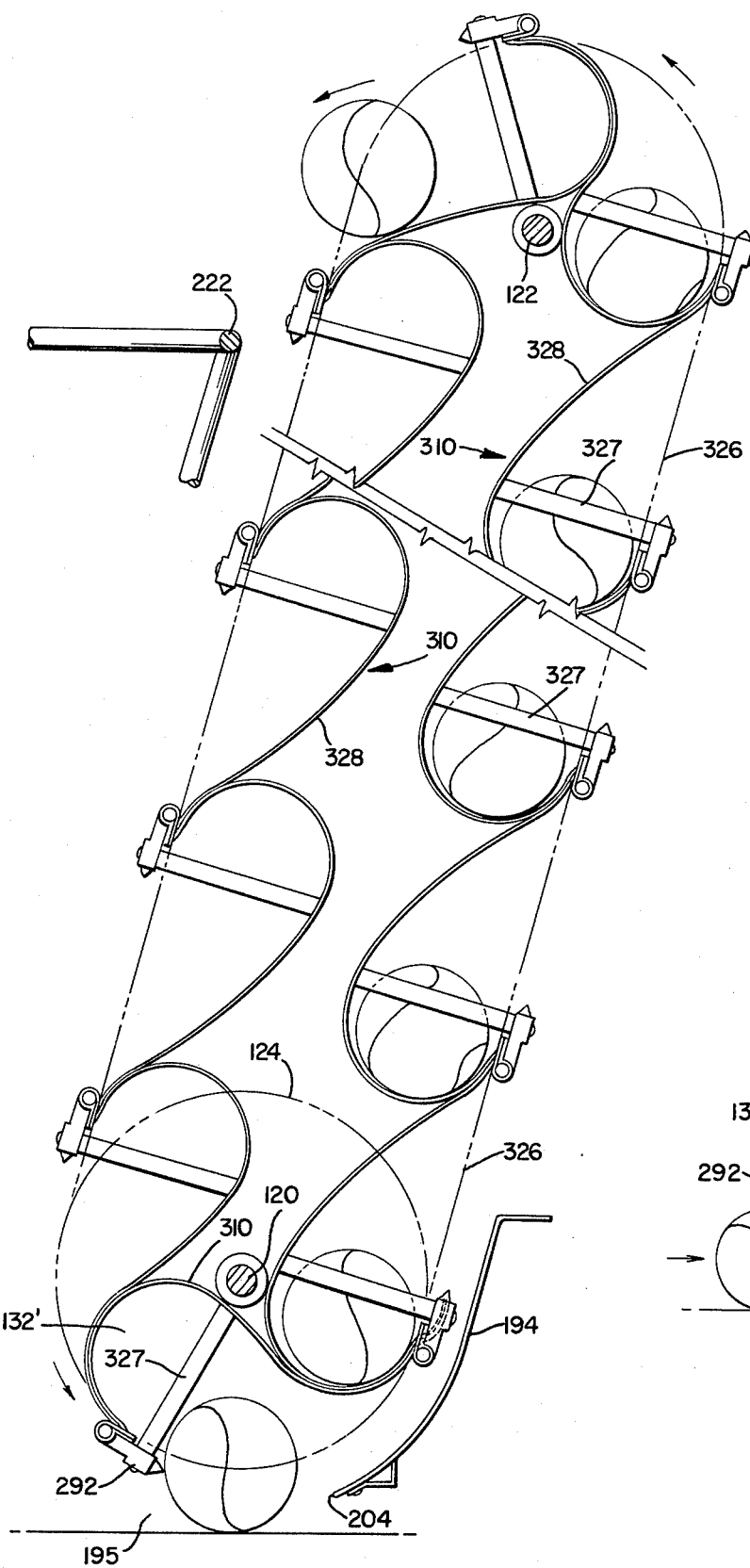
FIG. 16 is a section taken substantially in the same plane as sections 9 and 10 and showing a modified construction of the ball-lifting conveyor.

Each of the pockets 374 is formed from a flexible sheet 380 of elastically deformable material which may be the same as that used in the embodiment shown in FIG. 16. To accomodate attachment of the pocket-defining sheets 380, each of the cross bars 372 has a hollow, square configuration in cross section and is formed with a slot 382 through its back wall 384. In this embodiment, the back walls 384 of each cross bar 372 lies parallel to the conveyor's front and rear rectilinear flights 386 and 388 when cross bars 372 are advanceing along the conveyor flights. The cross bar slots 382 therefore extent normal, rather than parallel to the conveyor flights 386 and 388 and hence normal to the path along which the cross bars are advanced.

Each pocket-defining sheet 380 spans the space between adjacently disposed cross bars 372 as shown, and the leading and trailing terminal ends of each sheet 380 extends through the slots 382 and into the hollow interiors of the adjacently disposed cross bars 372. With this arrangement, the trailing terminal end of each sheet 380 and the leading end of the next adjacent pocket-defining sheet are received in back-to-back relation in the same slot (382) of the cross bar (372) which lies between the two adjacent pocket-defining sheets 380. Each cross bar 370 therefore defines the trailing edge of a different one of the conveyor pockets 374 and also the leading edge of the next adjacent ball-receiving pocket similar to the embodiments shown in FIGS. 9 and 16.

Suitable fasteners, such as rivets 380, secure the back-to-back terminal ends of the pocket-defining sheets 380 to their respective cross bars 372.

Because of the orientation of the cross bar slots 382, the attachment of sheets 380 to cross bars 374, and the elastically deformable characteristic of sheet 380, each of the pocket-defining sheets bow inwardly in the manner shown in FIG. 23 such that pockets 374 open horizontally outwardly and transversely of flights 386 and 388 as the pockets advance along flights 386 and 388. With this pocket configuration, the array of pockets extending along each of the conveyor flights present a scalloped-like formation in side elevation as shown in FIG. 23. In this embodiment the undeformed depth of each pocket 374 is less than the tennis ball's diameter.

To retain the balls in pockets 374 as they are lifted along the upwardly and rearwardly inclined, rear conveyor flight 388, a ball-retaining tray 392 is rigidly mounted on frame structure 22 above backstop 194 just rearwardly of and parallel to the straight path that cross bars 372 follow along conveyor flight 388. As shown, tray 392 extends from a region closely adjacent to the upper end of backstop 194 to a region beyond conveyor flight 388. Tray 392 has a forwardly facing flat surface 394 that is parallel to flight 388. The uniform distance extending perpendicularly of flight 388 between surface 394 and the bottoms of pockets 374 as they advance along flight 388 is equal to or preferably slightly less than the diameter of a tennis ball so that tennis balls received in pockets 374 will contact surface 394 and will be slightly compressed between tray 392 and the bottoms of pockets 374 as the pockets advance upwardly and rearwardly along conveyor flight 388. In this embodiment a ramp or backstop 194' is used in place of backstop 194 and is of slightly different curvature than backstop 194.

Conveyor 370 is driven from one of the handcart's ground-engaging wheels by belt and pulley assembly 146 and pawl and ratchet assembly 114 in the same manner as described in the embodiment of FIGS. 1-10.

In the operation of conveyor 370, each cross bar 372 will engage balls lying on the ground or floor surface in ball pickup zone 195 at the lower end of the conveyor below the ball's centroid as the cross bars advance along the lower turn-around region of conveyor 370. Cross bars 372 thus urge the balls into engagement with the ramp or backstop 194' to lift them onto the backstop in a manner similar to the embodiment shown in FIGS. 1-10. In this embodiment, however, the balls will be urged into an adjacent ball-receiving pocket (374) as they are pushed onto the lower, curved lip portion 397 of backstop 194'.

Upon being delivered to pockets 374 and raised upwardly thereby, the balls will be retained in pockets 374 by contact with tray 392 until they enter the upper turn-around region of conveyor 370. As pockets 374 advance through the top portion of the conveyor's upper turn-around region the balls come out of contact with tray 392 and pockets 374 will open upwardly to cradle the balls therein.

Cam 376 is centrally, non-rotatably fixed on conveyor shaft 122 and has an arcuate camming surface 396. The bottoms of pockets 374 ride on the camming surface 396 as the pockets are advanced around the conveyor's upper turn-around region such that the surface 396 flexes and partially flattens the bottoms of each pocket 374 to reduce the pocket depth as shown in FIG. 23.

As each pocket 374 moves over center with respect to a line normally intersecting the axes of shafts 120 and 122 to start its advancement downwardly towards flight 386, the bottoms of each pocket 374 arrives at a ball discharge position (indicated at D in FIG. 23) where it rides over the forwardly directed straight edge 398 of cam 376. Cam edge 398 flexes the pocket outwardly in the direction of basket 219 to forcibly urge the balls out of the pocket and into the basket 219.

As shown, tray 392 has forwardly extending side portions 401 that keep the balls from falling laterally out of the sides of the conveyor's pockets as they are raised.

From the foregoing description it will be appreciated that the manipulations involved in retrieving balls with the various embodiments of this invention comprises the steps of first continuously collecting and concentrating scattered balls lying on the ground or floor surface preparator to pickup, then continually picking up and raising the collected balls at ground or floor level while continuing to collect the balls, and finally gathering the raised balls in a group approximately waist level while continuing to collect, pick up and raise the balls. "Approximate waist level" is defined herein as being the region extending from about an adult's waist and to about midway between the adult's waist and knees so that the collected balls are at least nearly within the adult's non-bending reach.

Types of conveyors other than the endless type shown herein, may be employed in this invention. Also, channels 83 are optional and may be eliminated by removing spacer rods 75–77 and tunnel sections 84–87. Additionally, vanes 70 and 72 may be made from relatively stiff, elastically deformable plastic material to enable them to flex as they are brought into contact with a fence or vertical wall surface.

The embodiment illustrated in FIGS. 27–38 is the same as the one shown in FIG. 1 except for three differences. First, gate 73 is replaced by a special gate and shoe assembly 420 (see FIG. 29). Second, a pair of channel-forming side guide plates or shields 422 and 424 are used in place of the spacer rods 74–78 and tunnel sections 84–87. Third, a pair of retractable vane and guide frame assemblies 430 and 431 may optionally be employed in place of vanes 70 and 72.

Figure 27:
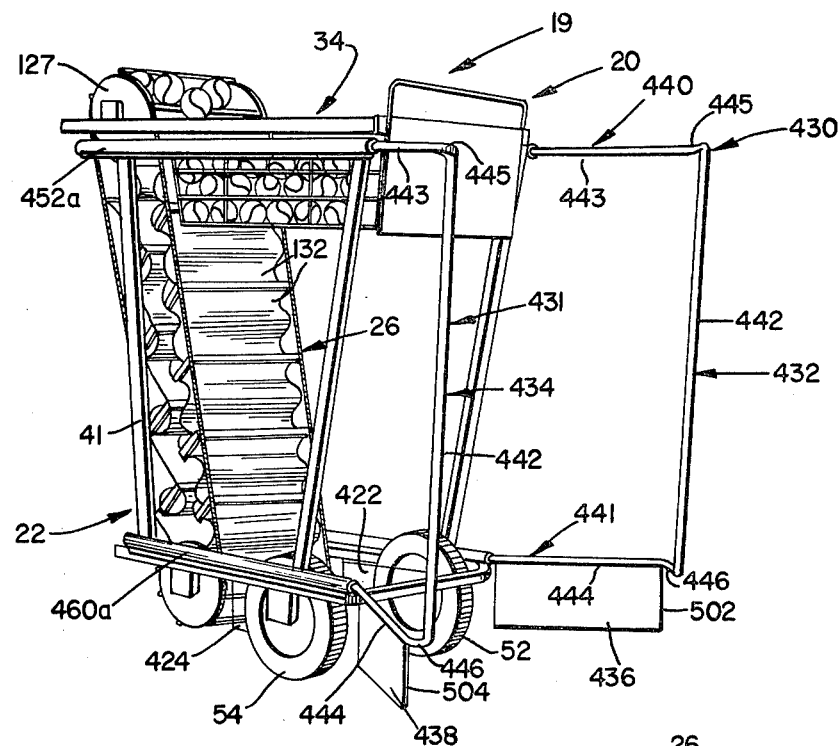
FIG. 27 is a perspective view of a ball-retrieving handcart according to still another embodiment of this invention.
Figure 28:
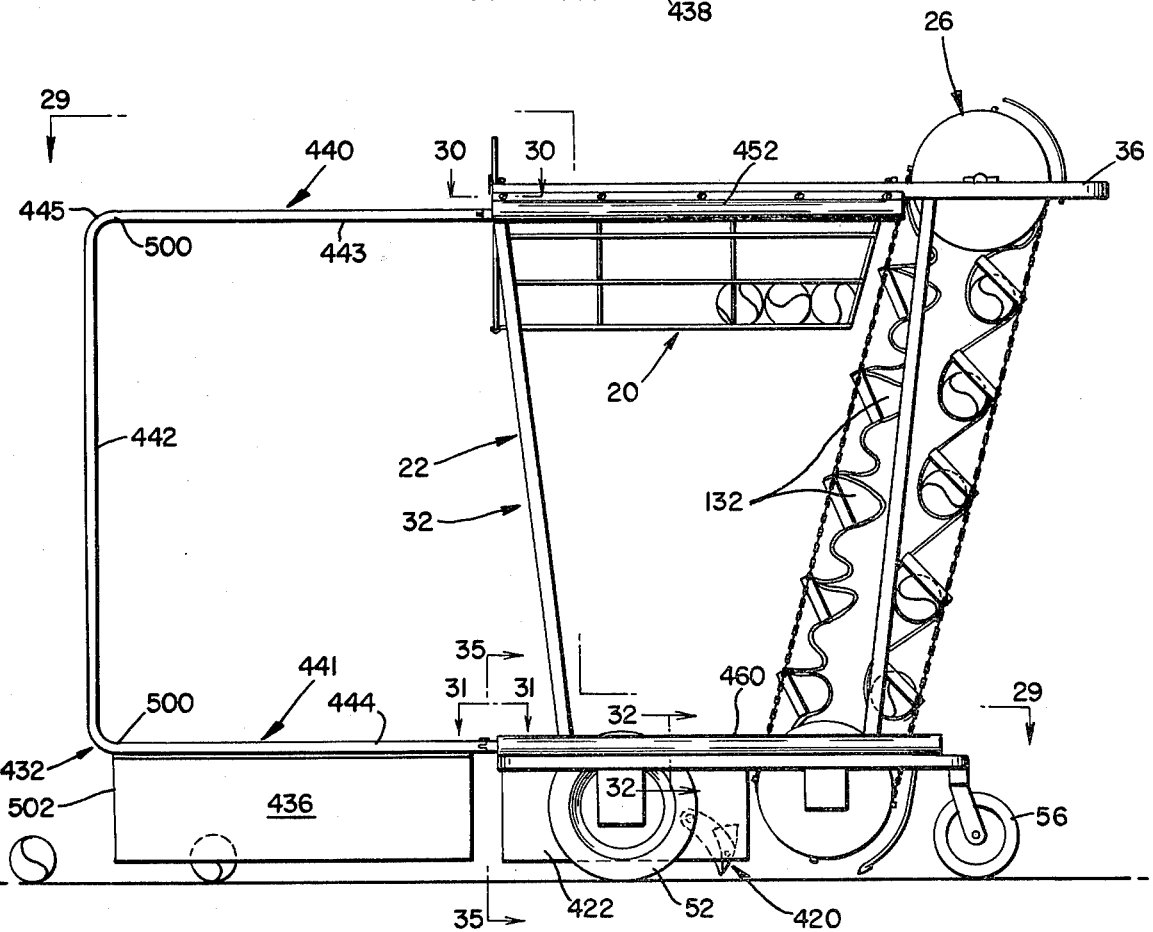
FIG. 28 is a side elevation of the ball-retrieving handcart shown in FIG. 27.

As shown in FIGS. 27–29, assembly 430 comprises a rigid c-shaped guide frame 432 and a ball deflection blade or vane 436. Assembly 431 likewise comprises a rigid c-shaped guide frame 434 and a ball deflection vane or blade 438. Frames 432 and 434 respectively mount blades 436 and 438 on opposite sides of handcart 19 as shown. Vanes 436 and 438 may be formed from flat-sided rigid structural plates.

Frame 432 is formed with a pair of upper and lower horizontally extending, parallel sections 440 and 441 and a further section 442 extending vertically between and integrally joining the forwardly extending ends of horizontal sections 440 and 441.

As shown, frame sections 440 and 441 are respectively formed with coextensive straight portions 443 and 444. Additionally, sections 440 and 441 are respectively formed with a pair of coextensive curved portions 445 and 446. The curved frame portion 445 extends between and integrally joins the upper end of the vertical frame section 442 and the straight frame portion 443. The curved frame portion 446 similarly extends between and integrally joins the lower end of the vertical frame section 442 and frame portion 444. Portions 445 and 446 are curved inwardly towards a vertical plane medially intersecting handcart 19. Vane 436 is rigidly fixed to an depends from the lower straight frame portion 444 and extends parallel therewith.

At its rearward end the upper straight frame portion 443 is pivotally secured to a straight runner 448 by a spring biased pivot pin 450. Runner 448 is slidably received and confined for longitudinal movement in a straight rigid support tube 452. Tube 452 is rigidly fixed to the upper portion of the side framework 32 and extends parallel to the longitudinal axis of handcart 19. Frame section 441 is fixed to pivot pin 450, and pin 450 is journalled in a bore which formed through the forward end of runner 448 as shown in FIG. 33.

As shown in FIG. 31 the rearward end of the lower frame portion 444 is pivotally secured to another straight runner 456 by a spring biased pivot pin 458. Runner 456 is slidably received and confined for longitudinal movement in a straight tube 460. Tube 460 is rigidly fixed to the lower region of the side framework 32 and extends lengthwise of handcart 19 in parallel relation with tube 452. Frame section 441 is fixed to pivot pin 458, and pin 458 is journalled in a bore which is formed through the forward end of runner 456 similar to the construction illustrated in FIG. 33.

The pin 458 is axially aligned with pin 450. Frame 432 is therefore pivotal about the aligned vertical axes of the two pivot pins. Springs 454 and 462 bias frame 432 is a counter-clockwise direction about the aligned axes of pins 450 and 458 as viewed from FIGS. 30 and 31. Spring 454 is connected to pin 450 and anchored to runner 448, and spring 462 is connected to pin 458 and anchored to runner 456.

By virtue of the construction just described it will be appreciated that guide frame 432 is supported on frame structure 22 for manual displacement between an extended position shown in solid lines in FIGS. 27–29 and a retracted or stowed position shown in the phantom lines at 465 in FIG. 29. In its retracted position the straight frame portions 443 and 444 are slidably received in tubes 452 and 460, respectively. Tube 460 is formed with the longitudinally extending slot 468 to receive blade 436 when guide frame 432 is withdrawn to its retracted position.

Guide frame 432 is shiftable to its extended position by pulling forwardly on the guide frame to slide the straight frame portions 443 and 444 out of tubes 452 and 460, respectively. As the straight frame portions pass out of tubes 452 and 460, springs 454 and 462 swing guide frame 432 outwardly about the aligned axes of pivot pins 450 and 458. This pivotal movement of frame 432 is limited by abutment of the straight frame portions 443 and 444 with forwardly extending outwardly flared extensions 470 and 472 on tubes 452 and 460, respectively. Any suitable unshown stop means may be employed for limiting the forward displacement of guide frame 432.

In the extended position of the guide frame and vane assembly 430, both the guide frame 432 and vane 436 project forwardly of frame structure 22 at an outwardly diverging angle with respect to the longitudinal axis of handcart 19.

Guide frame 434 is the mirror image twin of guide frame 432. The corresponding parts of frames 434 and 432 are therefore designated by like reference numerals. Vane 438 is supported from guide frame 434 in the same manner described for the support of vane 436 from frame 432.

The construction supporting the frame and vane assembly 431 for movement between its extended position (see FIG. 27) and its retracted position (as indicated at 465a in FIG. 29) is the same as the support construction just described for frame assembly 430. Accordingly, like reference numerals suffixed by the letter a have been applied to designate the corresponding parts of the support construction for frame and vane assembly 431. As shown in FIG. 29, the frame support tubes 452a and 460a for frame 434 are rigidly fixed to the side framework 33.

In their extended positions, guide frames 432 and 434 extend forwardly of handcart 19 and are pivoted so that they diverge laterally outwardly. As a result, vanes 436 and 438 also diverge outwardly similar to vanes 70 and 72 to funnel or deflect balls on the ground into the entrance of a ball-receiving channel 490 (FIG. 29). Channel 490 has a uniform width and is defined between the straight, coextensive parallel portions of side guide plates 422 and 424. In their diverging, extended positions, vanes 436 and 438 present a ball-collection mouth that is considerably wider than the width of the ball-receiving pockets in conveyor 26 and the width of channel 490.

Frame assembly 430 is displaceable to its retracted position simply by aligning the straight horizontal end portions of frame 432 with tubes 452 and 460 and pushing the frame rearwardly to slide frame portions 443 and 444 into tubes 452 and 460. Frame assembly 431 is displaceable to its retracted position in the same manner, specifically by aligning the horizontal portions of frame 434 with tubes 452a and 460a and by pushing the frame rearwardly to slide the horizontally extending frame portions into tubes 452a and 460a.

By curving the forward ends of guide frames 432 and 434 inwardly toward each other as shown, they will not come into engagement or contact with vertical obstructions or other vertical surfaces (such as a fence or the tennis court net) as handcart 19 is pushed along a path adjacent to the vertical surface. Instead, only the smoothly curved, horizontally extending intermediate segments (indicated at 500 in FIGS. 28 and 29) of frames 432 and 434 will contact and slide along the vertical surface. In this manner, guide frames 432 and 434 will not catch in openings or apertures in such obstructions as fences or tennis court nets.

The vane and guide frame assemblies 430 and 431 are each inwardly swingable against the bias of their associated springs 454 and 462 upon coming into contact with a fence or other vertical wall surfaces. This action enables handcart 19 to be driven closely adjacent to or along side of a fence or other vertical wall surface as indicated at 501 in FIG. 34 to pick up balls hugging or lying near the vertical wall surface.

The leading edge of vane 436 is indicated at 502 and is flush with a line tangentially contacting the curved portion 445 of frame 432 and extending parallel to the longitudinal axis of handcart 19. Similarly, the leading edge of vane 438, which is indicated at 504 in FIG. 29 is flush with a line tangentially contacting the corresponding curved portion of frame 434 and extending parallel to the handcart's longitudinal axis. By this construction each of the vanes 436 and 438 is effective to get behind a ball lying against or very closely adjacent to the obstructing vertical surface as shown in FIG. 34. Thus, as handcart 19 is pushed approximately parallel to the vertical surface the ball will by scrapped away from the vertical surface and deflected into channel 490.

As shown in FIG. 29, the forward ends of the side guide plates 422 and 424 may be flared outwardly to form fixed continuations of vanes 436 and 438 for smoothly directing the tennis balls into channel 490.

The width of channel 490 extending perpendicularly between the parallel portions of plates 422 and 424 is selected to be equal or closely equal to the common ball-receiving widths of the pocket 132 in conveyor 26.

The widths of pockets 132 and hence of channel 490 are preferably selected to be equal to a multiple of the tennis ball's diameter so that channel 490 is just wide enough to receive a selected number of tennis balls abreast in side-by-side relation. For example, the width of channel 490 may be four times the diameter of a tennis ball thus allowing only four balls abreast in a row across channel 490.

The side guide plates 422 and 424 terminate at their rearward ends as close to the lower portion of conveyor 26 as practical. Therefore, lateral movement of the tennis balls is restricted by plates 422 and 424 immediately prior to the entry of the balls into conveyor 26.

From the description thus far it will be appreciated that tennis balls lying on the ground will be randomly scattered as they enter channel 490. They therefore have no particular order of pre-selected formation. This random arrangement if not corrected may lead to the conjestion and jamming of balls in the ball pick-up zone at the lower end of the conveyor 26 to make the pick-up of balls less efficient. The ball shoe and gate assembly 420 controls the presentation of the tennis balls to conveyor 26 in a manner that eliminates this problem.

In particular, assembly 420 operates to arrange the randomly scattered balls in a pre-selected formation wherein the lead balls in channel 490 are lined up, one deep, in a straight, transverse row or line across channel 490 and are spaced from the remainder of the balls in the channel. To establish this formation, assembly 420 is located in channel 490 and is shown in FIGS. 35-38 to comprise a yoke structure 510, a ball-engaging shoe 512 forming a part of or fixed to yoke structure 510, and a gate 514.

In the illustrated embodiment yoke structure 510 comprises a pair of yoke arms 516 snd 518. Yoke arm 516 is pivotally secured at its upper end to guide plate 422 by a pivot pin 520. Yoke 518 is similarly pivotally supported at its upper end to side guide plate 424 by a pivot pin 522. Pins 520 and 522 are aligned along a common, horizontal pivot axis indicated at 523 in FIG. 35.

In this embodiment shoe 512 forms a part of yoke structure 510 and defines a cross piece which extends horizontally between yoke arms 516 and 518 and which is fixed at opposite ends to yoke arms 516 and 518 to rigidly join the yoke arms together. Shoe 512 spans channel 490 near the rearward end thereof so that it lies normal to the path of relative movement between handcart 19 and the balls lying on the ground. The entire yoke structure comprising yoke arms 516 and 518 and shoe 512 is pivotal as a unit pivot axis 523.

Figure 37:
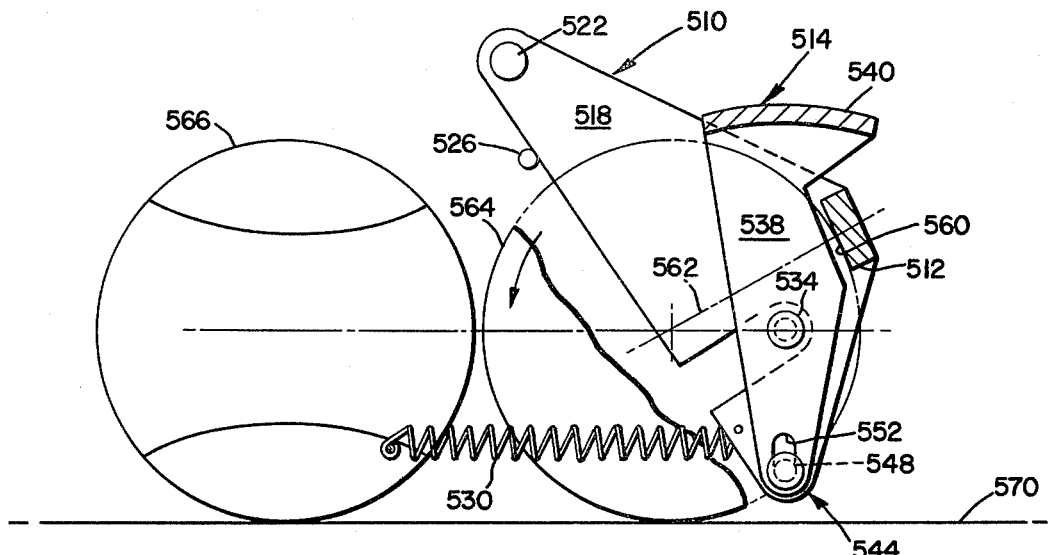
FIG. 37 is a section taken substantially along lines 37—37 of FIG. 35.
Figure 38:
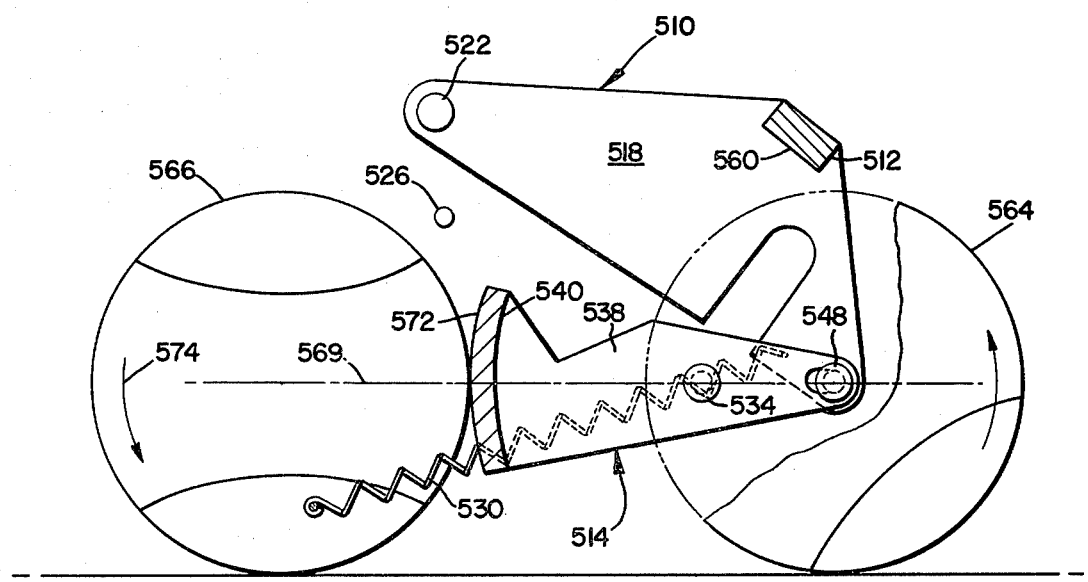
FIG. 38 is a view corresponding to FIG. 37, but showing the component parts of the shoe and gate mechanism in the positions that they occupy when the gate of the mechanism is closed.
Figure 35:
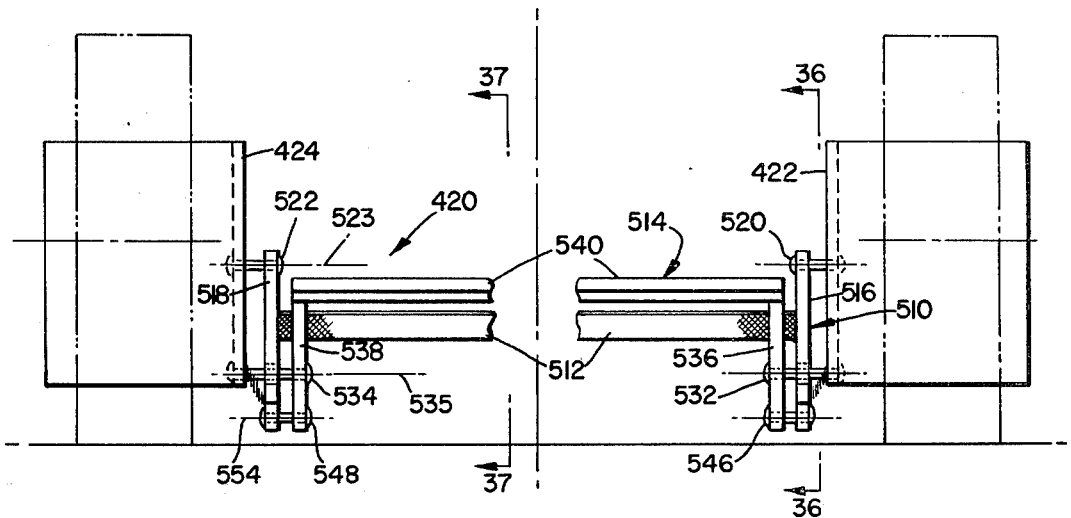
FIG. 35 is a section taken substantially along lines 35—35 of FIG. 28.
Figure 36:
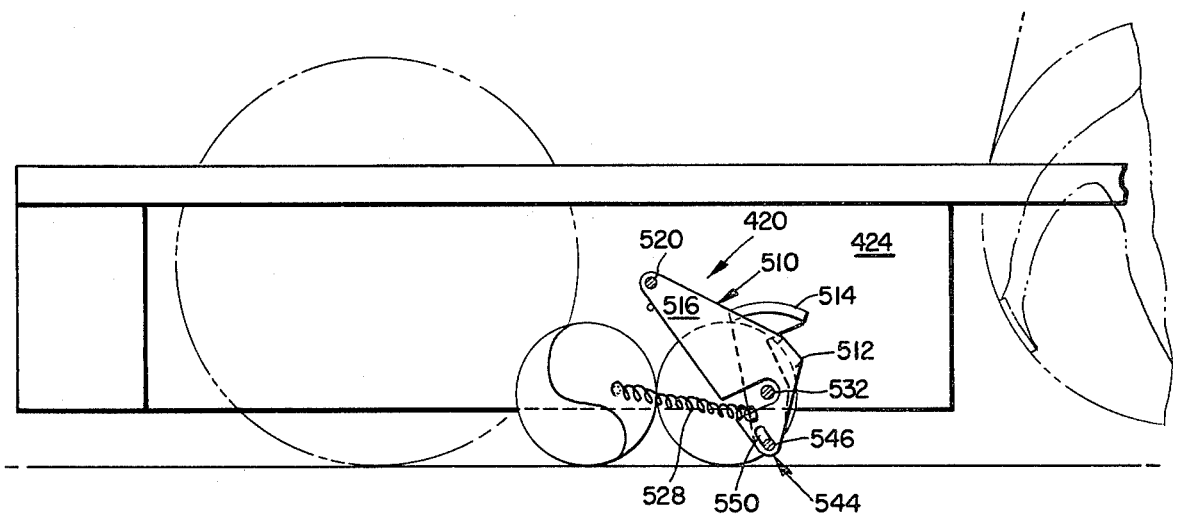
FIG. 36 is a section taken substantially along lines 36—36 of FIG. 35.

A rigid stop 526 (see FIG. 37) fixed to plate 424 is abuttable with yoke arm 518 to limit clockwise pivotal displacement of yoke structure 510 as viewed from FIGS. 36-38. Yoke structure 510 is biased in a clockwise direction to this limiting position by a pair of coiled springs 528 and 530.

As shown, gate 514 is disposed between yoke arms 516 and 518 and is pivotally supported by axially aligned pivot pins 532 and 534 on plates 422 and 424 for pivotal movement about a horizontal axis 535. Axis 535 lies parallel to the yoke's pivot axis 523. The gate axis 535 is located at a level below pivot axis 523 and is disposed rearwardly of axis 523.

In the illustrated embodiment gate 514 is provided with a pair of parallel spaced apart arms 536 and 538 which lie parallel to yoke arms 516 and 518. Arm 536 is adjacent to yoke arm 516, and arm 538 is adjacent to yoke arm 518. Pivot pin 532 freely extends to an enlarged slot in yoke arm 516, and pivot pin 534 likewise extends freely an enlarged slot in yoke arm 518 to avoid interference with the pivotal displacement of yoke structure 510. The ball engaging portion of gate 514 is in the form of a cross piece 540 which is rigidly joined at opposite ends to arms 536 and 538.

A pin and slot connection generally indicated at 544 interconnects yoke structure 510 and gate 514. In the illustrated embodiment connection 544 is defined by a pair of pins 546 and 548. Pins 546 and 548 are fixed to the gate arms 536 and 538, respectively. From arm 536 pin 546 extends through an elongated slot or aperture 550 in the yoke arm 516. Similarly, pin 548 extends through an elongated slot or aperture 552 in the lower end of yoke arm 518. The axes of pins 546 and 548 are aligned along a common horizontal axis indicated at 554 in FIG. 35. The horizontal axis 554 is parallel with the gate's pivot axis 535 and also with yoke's pivot axis 523.

As shown, the gate's pivot axis 535 is disposed above the ground surface by a distance equal to the radius of a tennis ball so that it is at the same level as the centroids of the balls. Furthermore, the arrangement of component parts in assembly 420 is such that axis 554 will be vertically below the gate's pivot axis 535 when yoke structure 510 is in its limiting position where it abuts stop 526.

Shoe 512 is provided with a high friction ball engaging face or surface 560. In the limiting position shown in FIG. 37 a line 562 extending perpendicularly with respect to shoe surface 560 passes through the centroid of the leading ball that is contacted by shoe 512.

Line 562 intersects shoe 512 about midway between the upper and lower edges of the shoe and extends at an acute angle with respect to the ground surface. Shoe surface 560 may be roughened to provide the high friction contact with the balls.

When no balls are received in channel 490 the component parts of assembly 420 will be in their rest positions as shown in FIG. 37. For this rest condition, gate 514 is open in its illustrated raised position, and shoe 512 is in a position where it will block transmittal of balls to conveyor 26.

From the position of parts shown in FIG. 37 it is clear that shoe surface 560 faces forwardly and downwardly so that the lead balls in channel 490 tend to become wedged between shoe 512 and the relatively high friction ground surface such that a force couple is created through the centroids of the contacted balls. The force couple acts in a direction to pivot the shoe 512 and hence yoke structure 510 upwardly about axis 523. The construction of mechanism 420 is such that the magnitude of the force couple set up by the engagement of shoe 512 with a perselected number of balls (such as one) will be sufficient to swing gate 514 and yoke structure 510 to the positions shown in FIG. 38 in the course of driving handcart 19 forwardly.

The upward pivotal movement of yoke structure 510 will terminate when shoe 512 is raised high enough to clear the top of the lead balls as shown in FIG. 38. When yoke structure 510 reaches this position, gate 514 will have been swung downwardly to its horizontally extending, closed position shown in FIG. 38. In this position gate 512 will be behind the lead ball or balls (indicated at 564 in FIGS. 37 and 38) between the lead ball or balls 564 and the trailing ball or balls (indicated at 566 in FIGS. 37 and 38). In its closed position gate 514 lies at a level where it abuts and blocks passage of the trailing balls immediately behind or trailing the lead balls 568.

When gate 514 is in its closed position a plane (indicated at 569 in FIG. 38) containing the pivot axes 535 and 554 will pass through the centroids of balls 566 and will lie parallel to the flat ground surface indicated at 570. Thus, as handcart 19 is pushed forwardly the line of force exerted by gate 514 on the trailing balls 566 will pass through axes 535 and 554 and the centroids of the trailing balls 566.

As a result of pivoting gate 514 to its closed position the trailing balls 566 will be held back momentarily, slipping on the gate's smooth, arcuately contoured ball engaging surface 572 as they rotate in the direction of the arrow indicated at 574.

Upon receiving randomly scattered balls in channel 490 the lead ball or balls will be contacted by the high friction shoe face 560 as handcart 19 is driven forwardly. As a result, the lead balls contacted by the shoe face 560 will be lined up abreast in a straight row across channel 490. The high friction of shoe face 560 will set up the previously mentioned force couple through the centroids of the contact lead balls, and this force couple will be sufficient to pivot yoke structure 510 upwardly in a counterclockwise direction (as viewed from FIGS. 37 and 38) against the bias exerted by springs 528 and 530. This upward pivotal displacement of yoke structure 510 is transmitted by the pin and slot connection 544 to cause gate 514 to pivot downwardly in a counterclockwise direction to its closed position shown in FIG. 38.

As soon as shoe 512 is pivoted upwardly by a sufficient distance to ride over the tops of the lead balls 564, balls 564 will be released for reception in conveyor 26 by continued advancement of handcart 19. The lead balls 564 presented to conveyor 26 will therefore be in a single straight row extending normally of channel 490. As soon as the lined-up lead balls 564 leave engagement of shoe 512 on their way to conveyor 26, springs 528 and 530 will snap yoke structure 510 down and swing gate 514 up to the positions shown in FIG. 37, thus releasing the trailing balls 566 and bringing shoe 512 into contact with the released balls to initiate the next cycle.

From the foregoing description it will be appreciated that mechanism 420 is actuated by engagement with one or more of the scattered lead balls in channel 490 first to line up the lead balls in a straight row up to four abreast across channel 490, then to block passage of the trailing balls and to release the lined up lead balls for presentation to conveyor 26, and finally to release the trailing balls to repeat the cycle.

What is claimed and desired to be secured by Letters Patent is:

1. A handcart for retrieving tennis balls lying on a ground or floor surface and comprising a support structure, a plurality of ground engaging wheels mounted on said support structure for enabling the handcart to be wheeled along said surface, a ball collection receptacle supported on said structure, means supported on said structure for picking up tennis balls lying on said surface and depositing the picked-up balls in said receptacle, means comprising a pair of diverging ball guide vanes carried by and projecting forwardly of said support structure for gathering and guiding scattered balls lying on said surface toward a region where they are picked up by said means for picking up the balls without lifting the balls off the ground, said ball guide vanes extending forwardly of said support structure to form a channel for capturing scattered balls lying on said surface, means pivotally mounting each of said vanes on said support structure for swinging movement about an upstanding pivot axis and spring means connected to each vane to bias said vanes outwardly in opposite directions about their pivot axes, each vane being swingable inwardly towards a longitudinal vertical plane medially intersecting said support structure by engagement with a fence or vertical wall surface to enable the handcart to be wheeled closely adjacent to said fence or wall surface and to position one of said vanes adjacent to said fence or wall surface to collect balls lying close to said fence or wall surface.

2. A handcart for retrieving tennis balls lying on a ground or floor surface and comprising a support structure, a plurality of ground engaging wheels mounted on said support structure for enabling the handcart to be wheeled along said surface, a ball collection receptacle supported on said structure, means supported on said structure for picking up tennis balls lying on said surface and depositing the picked-up balls in said receptacle, means comprising a pair of diverging ball guide vanes carried by and projecting forwardly of said support structure for gathering and guiding scattered balls lying on said surface toward a region where they are picked up by said means for picking up the balls without lifting the balls off the ground, said ball guide vanes extending forwardly of said support structure to form a channel for capturing scattered balls lying on said surface, a post member mounted on a forward end of each of said vanes and extending upwardly therefrom to keep the vane from entering in apertures in fences or other obstacles, and elongated flexible means connected to the post members and spanning the ball-receiving mouth defined between said vanes at a level above tennis balls lying on said ground or floor surface.

3. A handcart for retrieving tennis balls lying on a ground or floor surface and comprising a support structure, a plurality of ground engaging wheels mounted on said support structure for enabling the handcart to be wheeled along said surface, a ball collection receptacle supported on said structure, means supported on said structure for picking up tennis balls lying on said surface and depositing the picked-up balls in said receptacle, means comprising a pair of diverging ball guide vanes projecting forwardly of said support structure for gathering and guiding scattered balls lying on said surface toward a region where they are picked up by said means for picking up the balls without lifting the balls off the ground, said ball guide vanes extending forwardly of said support structure to form a channel for capturing scattered balls lying on said surface, first and second frames, means mounting said frames one on each side of said support structure for pivotal movement about vertical pivot axes and additionally for displacement between (a) extended positions where they extend forwardly of said support structure and (b) withdrawn positions where they are retracted rearwardly from the extended positions, each ball guide vane being carried by a different one of said first and second frames for movement therewith, and means biasing said frames outwardly in opposite directions about their pivot axes, the forward ends of said frames being curved inwardly toward each other to provide each frame with a curved portion that is engageable with and slidable along a fence or other vertical surface without causing the forward ends of the frames or said vanes to contact the vertical surface, and each frame being swingable inwardly about its pivot axis by engagement with said vertical surface to enable the handcart to be wheeled closely adjacent to said vertical surface and to position the forward end of one vane or the other adjacent to said vertical surface for deflecting balls lying close to said vertical surface into the region between said vanes.

* * * * *